(12) United States Patent
Inoue et al.

(10) Patent No.: US 7,434,190 B2
(45) Date of Patent: Oct. 7, 2008

(54) ANALYSIS METHOD AND ANALYSIS APPARATUS OF DESIGNING TRANSMISSION LINES OF AN INTEGRATED CIRCUIT PACKAGING BOARD

(75) Inventors: Hirobumi Inoue, Tokyo (JP); Daisuke Ohshima, Tokyo (JP); Jun Sakai, Tokyo (JP); Mitsuru Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 186 days.

(21) Appl. No.: 11/473,345

(22) Filed: Jun. 23, 2006

(65) Prior Publication Data
US 2007/0033564 A1     Feb. 8, 2007

(30) Foreign Application Priority Data
Jun. 24, 2005    (JP)    ............... 2005-185341

(51) Int. Cl.
G06F 17/50    (2006.01)
(52) U.S. Cl. ................. 716/15; 716/1; 716/14
(58) Field of Classification Search ............ 716/15, 716/1, 14
See application file for complete search history.

(56) References Cited
U.S. PATENT DOCUMENTS
4,811,082 A * 3/1989 Jacobs et al. ............... 257/700
6,020,633 A * 2/2000 Erickson .................... 257/723

FOREIGN PATENT DOCUMENTS
JP    05-051134    2/1996

* cited by examiner

Primary Examiner—Sun J Lin
(74) Attorney, Agent, or Firm—Foley & Lardner LLP

(57) ABSTRACT

An analysis method of designing transmission lines of an integrated circuit packaging board including an integrated circuit chip, a printed circuit board, and an interposer disposed between the integrated circuit chip and the printed circuit board. A reference data file having information for dividing a series of transmission lines into connecting sections and/or continuous sections and a division model file having information on analysis models of a connecting section and a continuous section is prepared. The connecting sections are extracted from the series of transmission lines with reference to connection information. Boundaries for dividing the series of transmission lines into sections is determined with reference to the reference data file to generate division models. The division models are synthesized to form a synthesized model of the series of transmission lines to analyze electrical characteristics of the series of transmission lines.

18 Claims, 18 Drawing Sheets

| TYPE OF BOUNDARY | LSI TRANSMISSION LINE/DIVISION MODEL 11 | DIVISION MODEL 11/DIVISION MODEL 101 | DIVISION MODEL 101/DIVISION MODEL 13 | DIVISION MODEL 13/PRINTED CIRCUIT BOARD TRANSMISSION LINE |
|---|---|---|---|---|
| WIRING PATTERN BOUNDARY | BETWEEN LSI TRANSMISSION LINE AND GLOBAL LINE | BETWEEN FC PAD AND INTERPOSER TRANSMISSION LINE | BETWEEN INTERPOSER TRANSMISSION LINE AND VIA | BETWEEN PAD IN PRINTED CIRCUIT BOARD AND PRINTED CIRCUIT BOARD TRANSMISSION LINE |
| MINIMUM DISTANCE IN CHIP DIRECTION | HALF OF THICKNESS OF DIELECTRIC IN LSI TRANSMISSION LINE | | HALF OF THICKNESS OF DIELECTRIC IN INTERPOSER TRANSMISSION LINE | – |
| MAXIMUM DISTANCE IN CHIP DIRECTION | HALF OF LENGTH OF LSI TRANSMISSION LINE | | HALF OF LENGTH OF INTERPOSER TRANSMISSION LINE | – |
| MINIMUM DISTANCE IN BOARD DIRECTION | – | HALF OF THICKNESS OF DIELECTRIC IN INTERPOSER TRANSMISSION LINE | | HALF OF THICKNESS OF DIELECTRIC IN PRINTED CIRCUIT BOARD TRANSMISSION LINE |
| MAXIMUM DISTANCE IN BOARD DIRECTION | – | HALF OF LENGTH OF INTERPOSER TRANSMISSION LINE | | HALF OF LENGTH OF PRINTED CIRCUIT BOARD TRANSMISSION LINE |

FIG. 6

| TYPE OF WIRING | MODEL ARRANGEMENT |
|---|---|
| WIRING A | DIVISION MODEL 21/DIVISION MODEL 102/DIVISION MODEL 23/DIVISION MODEL 104/DIVISION MODEL 25 |
| WIRING B | DIVISION MODEL 21/DIVISION MODEL 202/DIVISION MODEL 23/DIVISION MODEL 204/DIVISION MODEL 25 |
| WIRING C | DIVISION MODEL 21/DIVISION MODEL 302/DIVISION MODEL 23/DIVISION MODEL 304/DIVISION MODEL 25 |
| WIRING D | DIVISION MODEL 21/DIVISION MODEL 402/DIVISION MODEL 23-1/DIVISION MODEL 404/DIVISION MODEL 23-2/DIVISION MODEL 405/DIVISION MODEL 23-3/DIVISION MODEL 406/DIVISION MODEL 25 |

ANALYSIS METHOD AND ANALYSIS APPARATUS OF DESIGNING TRANSMISSION LINES OF AN INTEGRATED CIRCUIT PACKAGING BOARD

This application claims priority to prior Japanese patent application JP 2005-185341, the disclosure of which is incorporated herein by reference.

BACKGROUND OF THE INVENTION

The present invention relates to a method for analysis prior to design of a transmission line from a large scale integrated circuit (LSI) chip through an intermediate substrate to a printed circuit board. The present invention also relates to an analysis apparatus for performing such a method. Further, the present invention relates to a computer-readable storage medium having a program recorded thereon for executing such a method.

As LSI technology has been developed in recent years, computer aided engineering (CAE) has been used to design LSI chips to obtain a high operation speed. An electromagnetic field simulator has been put to practical use so as to solve Maxwell equations of three-dimensional models. For example, according to a conventional method of determining an equivalent circuit, which is disclosed in FIG. 4 of Japanese laid-open patent publication No. 8-51134, a circuit model is designed as follows. An inductance L and a ground capacitance C are used as a circuit model in a state in which a lead pin of a package having an LSI chip mounted thereon is mounted on a board (printed circuit board). Then, fitting is conducted so that the circuit model accords with S parameters calculated by an electromagnetic field simulator. In this manner, design models from 1 GHz to 6 GHz can be obtained.

Meanwhile, according to finer integration of LSIs, flip chip (FC) ball grid array (BGA) packages are used as a kind of high-speed LSI packages having a large number of pins for input and output signals.

FIG. 1 is an exterior perspective view showing an example of an FC-BGA. As shown in FIG. 1, the FC-BGA has an LSI chip 800, a printed circuit board 810, and an interposer 820 serving as an intermediate substrate for relaying signal lines from the LSI chip 800 to the printed circuit board 810. The packaged LSI chip 800 and interposer 820 is mounted on the printed circuit board 810.

FIG. 2 is a perspective view showing a main portion of the FC-BGA shown in FIG. 1. As shown in FIG. 2, the FC-BGA includes an LSI chip 800, a printed circuit board 810, and an interposer 820 serving as an intermediate substrate for relaying signal lines from the LSI chip 800 to the printed circuit board 810. The LSI chip 800 and the interposer 820 are electrically connected to each other via FC bumps (not shown). The interposer 820 and the printed circuit board 810 are electrically connected to each other via solder balls 822. The LSI chip 800 has an electrode pad electrically connected to the solder balls 822 via interposer transmission lines 824 and vias 830 in the interposer 820. The solder balls 822 are electrically connected to a printed circuit board transmission line 840 via a pad (not shown) provided on a surface of the printed circuit board 810.

In this FC-BGA, wiring pitches in the LSI chip 800 and wiring pitches in the printed circuit board 810 differ from each other by about three orders of magnitude. Accordingly, the interposer 820 is important in packaging design of FC-BGA because the interposer 820 absorbs scale differences between the pitches in the electrode pad of the LSI chip 800 and the pitches in the pad of the printed circuit board 810.

FIG. 3A is a schematic cross-sectional view of the interposer 820 shown in FIG. 1. FIG. 3B shows an equivalent circuit of the interposer 820 for analysis. As shown in FIG. 3A, the interposer includes an FC pad 850 for connection with the electrode pad of the LSI chip 800, a first via 831, an interposer transmission line 826, a second via 832, a third via 833, a fourth via 834, a relay line 827, a fifth via 835, and a BGA land 852 for connection with the solder ball. The first via 831, the interposer transmission line 826, the second via 832, the third via 833, the fourth via 834, the relay line 827, and the fifth via 835 are connected between the FC pad 850 and the BGA land 852 in the order named. As shown in FIG. 3A, the interposer has a multilayer structure including a plurality of conductive layers. In the following description, a portion connecting between different conductive layers in a direction perpendicular to a substrate surface of the interposer is referred to as an interlayer connecting section.

As shown in FIG. 3B, the FC pad 850 is replaced with a port 1, and the BGA land 852 is replaced with a port 2. Then, circuit constants for analysis are applied to the respective components from the first via 831 to the fifth via 835 so that each via is represented as a circuit model. Further, S parameters are applied to the interposer transmission line 826 and the relay line 827 so that each of the interposer transmission line 826 and the relay line 827 is represented as an S parameter model. Thus, the circuit models and the S parameter models are used to perform electromagnetic field analysis. This example employs mixed models of the circuit models and the S parameter models. In the following description, circuit models and S parameter models are referred to as analysis models.

The conventional method of determining an equivalent circuit, as disclosed by Japanese laid-open patent publication No. 8-51134, has the following drawbacks.

First, a design model of CAE cannot represent electric characteristics in a high-frequency range (GHz band). Accordingly, high speed cannot be maintained at currents ranging from a direct current to a high-frequency current at the time of design. Particularly, digital LSIs are required to represent characteristics in a high-frequency range because interconnections in the digital LSIs are used as wide-band transmission lines to achieve a high speed of processing. In a case of design of such high-speed multipin LSIs, a three-dimensional electromagnetic field analysis as shown in FIG. 2 should be performed to attach great importance to high-frequency characteristics of models to be generated.

However, the aforementioned method requires a large scale of a model. When the LSI has many terminals, computer resources cannot design the entire model but can design only part of the model. The method disclosed by Japanese laid-open patent publication No. 8-51134 generates a partial characteristic model including a lead pin and a board. Accordingly, this method can only be employed in an electromagnetic field analysis for the illustrated number of pins or several pins.

As described above, in the conventional method in which priority is given to high-frequency characteristics, characteristic analysis can be performed only for several pins. Thus, the entire multipin LSI cannot be modeled by the conventional method. Accordingly, only specific pins are represented by a model for operation analysis. Specifically, since a model representing high-frequency characteristics has a large scale, it cannot be applied to a multipin model. Thus, a model representing high-frequency characteristics cannot be utilized for packaging design (design for operational guarantee from an LSI chip through an interposer to a printed circuit board). Additionally, a designer should determine which parts to be extracted from the whole circuit to generate a model for specific pins. Thus, generated models are different in precision of test for high-frequency characteristics depending on the skill of designers.

When the entire transmission line from the LSI chip through the interposer to the printed circuit board is represented by the analysis models as shown in FIG. 3, it is possible to perform an analysis of a multipin model with certain computer resources. However, since the analysis model shown in FIG. 3 cannot represent high-frequency characteristics at a GHz band, it is difficult to guarantee the performance. Specifically, the conventional method cannot generate a model that can represent both of high-frequency characteristics and the entire characteristics from the LSI chip through the interposer to the printed circuit board and that can be employed for multipin design.

Second, high-frequency characteristics of high-speed multipin LSIs are tested based on data measured in a state in which an object (packaged LSI) is mounted on a board. Specifically, a product specification is determined, and the packaged LSI is mounted and measured after high-frequency LSI design, chip fabrication, packaging assembly, and inspection. Then, design, fabrication, and inspection are repeated. Thereafter, product fabrication is started. Accordingly, a large amount of time and cost is needed to accumulate data obtained from measurement and to reflect the data on design models.

SUMMARY OF THE INVENTION

The present invention has been made in view of the above drawbacks. It is, therefore, an object of the present invention to provide an analysis method and an analysis apparatus which can analyze high-frequency characteristics in high-speed multipin LSI packaging design.

Another object of the present invention is to provide a computer-readable storage medium having a program recorded thereon for executing an analysis method which can analyze high-frequency characteristics in high-speed multipin LSI packaging design.

According to one aspect of the present invention, an analysis method of designing transmission lines of an integrated circuit packaging board including an integrated circuit chip, a printed circuit board, and an interposer disposed between the integrated circuit chip and the printed circuit board, said analysis method comprising the steps of: preparing a reference data file having information for dividing a series of transmission lines, from the integrated circuit chip through the interposer to the printed circuit board, into sections each of which is classified into a connecting section or a continuous section, the connecting section electrically connecting different conductive layers to each other and the continuous section including a conductive layer having a uniform cross-section in a signal transmission direction; preparing a division model file having information on analysis models each of which corresponds to a division model including at least one of the connecting section and the continuous section; inputting connection information on positions of connecting section(s) in the series of transmission lines; extracting connecting section(s) from the series of transmission lines with reference to the input connection information; determining, with reference to the reference data file, boundary/ies for dividing the series of transmission lines into sections, each of which is a connecting section or a continuous section; generating, with reference to the division model file, division models each of which corresponds to one of the sections divided with the boundaries; synthesizing the division models to form a synthesized model of the series of transmission lines; and analyzing electrical characteristics of the series of transmission lines on the basis of the synthesized model is provided.

The analysis method may modify as follows: the extracting step determines, with reference to the connection information, whether a portion of the series of transmission lines is at least one of a connecting section between the integrated circuit chip and the interposer, a connecting section between layers in the interposer, and a connecting section between the interposer and the printed circuit board, in order to judge that the portion includes a connecting section; the determining step confirms whether or not the portion of the transmission lines has a uniform cross-section in the signal transmission direction, and determines a cutting point of the transmission lines in the signal transmission direction with reference to the reference data file; the generating step specifies, in the division model file: the information on the analysis model corresponding to the division model including the connecting section or the division model including the continuous section; the synthesizing step connects the information on the analysis models so as to correspond to the series of transmission lines to form the synthesized model; and the analyzing step performs transmission characteristic analysis or signal waveform analysis on the synthesized analysis model.

In the modified method, the reference data file may include information on a range of a distance from a boundary wall of the connecting section for the division model including the connecting section, the range having a minimum value of a half of a thickness of a dielectric in the transmission line and a maximum value at a center of the transmission line in the continuous section adjacent to the connecting section. In this case, the determining step may determine a cutting point of the transmission lines in the signal transmission direction with reference to the range in the reference data file for each division model including the connecting section.

The determining step may employ the maximum value for the boundary of the division model including the connecting section.

The information on the analysis models may include information on an S parameter model and/or information on a circuit model represented by a circuit constant.

The generating step may generate the division model including the connecting section in the interposer with a connecting section equivalent circuit having a first inductor connected to the connecting section in the signal transmission direction, a second inductor connected to the connecting section in a direction opposite to the signal transmission direction, a plurality of third inductors disposed between the first inductor and the second inductor, and a plurality of capacitors connected to connecting portions between the first inductor, the second inductor, and the plurality of third inductors and the synthesizing step may replace connection between the division model of the connecting section equivalent circuit and the adjacent division model with an equivalent circuit having an inductor connecting the division models to each other. In this case, the connecting section equivalent circuit may have five inductors and three capacitors.

The generating step may generate the division model including the continuous section in the interposer with a continuous section equivalent circuit having a first inductor connected to the continuous section in the signal transmission direction, a second inductor connected to the continuous section in a direction opposite to the signal transmission direction, a third inductor disposed between the first inductor and the second inductor, and a plurality of capacitors connected to connecting portions between the first inductor, the second inductor, and the third inductor, and the synthesizing step may replace connection between the division model of the continuous section equivalent circuit and the adjacent division model with an equivalent circuit having an inductor connecting the division models to each other.

Each of the first inductor and the second inductor may has an inductance of a half of that of a distributed constant circuit of the transmission line in the adjacent division model.

The synthesizing step may employ an equivalent circuit having a capacitor connected between a first division model including a first connecting section and a second division model including a second connecting section when the first division model and the second division model are provided in different transmission lines and spaced from each other within a predetermined range.

The synthesizing step may employ an equivalent circuit having a capacitor connected between a first division model including a first continuous section and a second division model including a second continuous section when the first division model and the second division model are provided in different transmission lines and spaced from each other within a predetermined range.

According to another aspect of the present invention, an analysis apparatus for designing transmission lines of an integrated circuit packaging board including an integrated circuit chip, a printed circuit board, and an interposer disposed between the integrated circuit chip and the printed circuit board, the analysis apparatus comprising: a storage device for storing a reference data file and a division model file, the reference data file having information for dividing a series of transmission lines, from the integrated circuit chip through the interposer to the printed circuit board, into a connecting section electrically connecting different conductive layers to each other and a continuous section including a conductive layer having a uniform cross-section in a signal transmission direction, the division model file having information on analysis models corresponding to a division model including the connecting section or a division model including the continuous section; an operation unit for inputting connection information of the series of transmission lines; and a controller operable to extract the connecting section from the series of transmission lines, determine a boundary for dividing the series of transmission lines into the connecting section and the continuous section with reference to the reference data file, generate division models including the information on the analysis models with reference to the information on the analysis model corresponding to the division model including the connecting section or the division model including the continuous section in the division model file, synthesize the information on the analysis models to form a synthesized model, and analyze electrical characteristics with use of the synthesized analysis model is provided.

According to another aspect of the present invention, a computer-readable storage medium having a program recorded thereon for executing a procedure with a computer for designing transmission lines of an integrated circuit packaging board including an integrated circuit chip, a printed circuit board, and an interposer disposed between the integrated circuit chip and the printed circuit board, the procedure comprising: storing a reference data file and a division model file, the reference data file having information for dividing a series of transmission lines, from the integrated circuit chip through the interposer to the printed circuit board, into a connecting section electrically connecting different conductive layers to each other and a continuous section including a conductive layer having a uniform cross-section in a signal transmission direction, the division model file having information on analysis models corresponding to a division model including the connecting section or a division model including the continuous section; inputting connection information of the series of transmission lines; extracting the connecting section from the series of transmission lines after the inputting the connection information; determining a boundary for dividing the series of transmission lines into the connecting section and the continuous section with reference to the reference data file; generating division models including the information on the analysis models with reference to the information on the analysis model corresponding to the division model including the connecting section or the division model including the continuous section in the division model file; synthesizing the information on the analysis models to form a synthesized model; and analyzing electrical characteristics with use of the synthesized analysis model is provided, According to the present invention, a series of transmission lines is divided into a division model including a continuous section and a division model including a connecting section. Analysis is performed with use of the information on the analysis models corresponding to the division models. Accordingly, it is possible to analyze an actual package structure more accurately.

According to an analysis method of the present invention, small division models are connected so as to form a synthesized model to describe the whole circuit. Therefore, analysis can be completed in a shorter period of time as compared to a case where an electromagnetic field analysis model is generated to describe the whole circuit. Further, the high-frequency characteristic accuracy can be maintained at a connecting portion between the divided models. Furthermore, the frequency characteristic accuracy can be maintained in a packaging structure after the division models are connected to each other. Accordingly, it is possible to test operation of the entire transmission line from an LSI chip, an interposer, and a printed circuit board.

The above and other objects, features, and advantages of the present invention will be apparent from the following description when taken in conjunction with the accompanying drawings which illustrate preferred embodiments of the present invention by way of example.

BRIEF DESCRIPTION OF THE DRAWING

FIG. 6 is a table showing an example of a reference data file for division models;

FIG. 17 is a table showing how to connect transmission lines shown in FIGS. 15A, 15B, 15C, and 16;

DESCRIPTION OF THE PREFERRED EMBODIMENTS

A method of LSI packaging design according to the present invention has the following features in an extraction method for dividing a series of transmission lines from an LSI chip through an interposer to a printed circuit board into analysis models.

Figure 4:
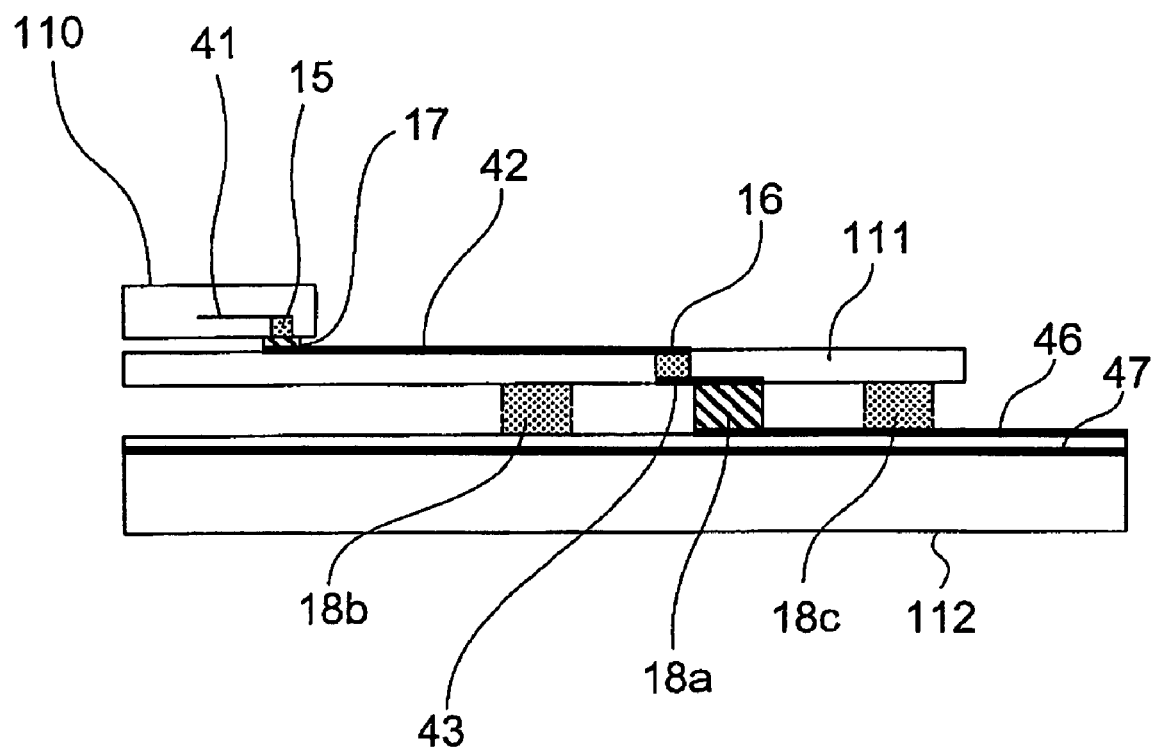
FIG. 4 is a cross-sectional view showing an example of a main portion of an FC-BGA to be analyzed.

First, a structure to be analyzed prior to LSI packaging design will be described below. FIG. 4 is a cross-sectional view showing an example of a main portion of an FC-BGA to be analyzed.

As shown in FIG. 4, the FC-BGA includes an LSI chip 110, an interposer 111, and a printed circuit board 112. An FC bump 17 is provided on the LSI chip 110 for connecting the LSI chip 110 to a transmission line 42 in the interposer 111. The FC bump 17 is connected to an LSI transmission line 41 via an LSI global line 15 in the LSI chip 110. The interposer 111 includes an interposer transmission line 42 connected to the FC bump 17, a via 16, and solder balls 18a to 18c. The via 16 and the solder ball 18a are connected to each other by a relay line 43. While the solder ball 18a is located on a cutting plane of FIG. 4, the solder balls 18b and 18c are not located on the cutting plane of FIG. 4. Actually, the solder balls 18b and 18c are located on the back side of the drawing in a direction perpendicular to the paper. The printed circuit board 112 includes a printed circuit board transmission line 46 connected to the solder ball 18a and a ground line 47 for reducing an impedance of the printed circuit board transmission line 46.

Figure 5A:
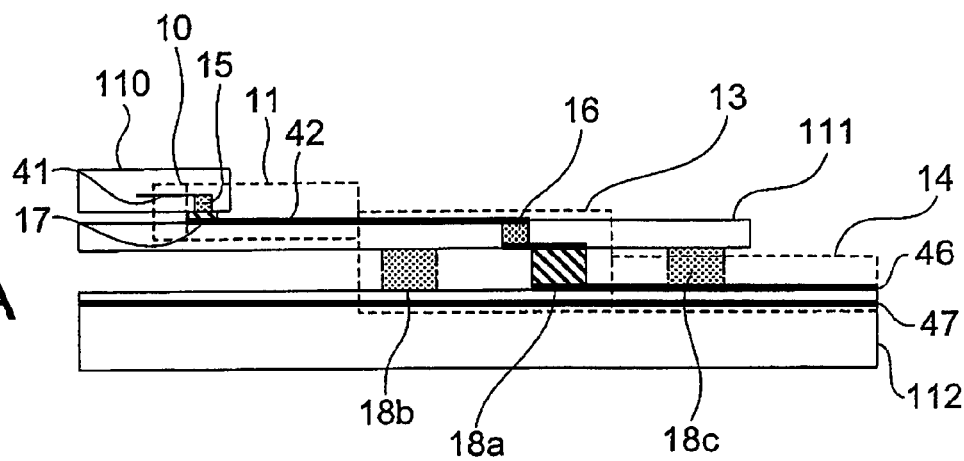
FIGS. 5A and 5B are views showing examples in which the FC-BGA shown in FIG. 4 is divided into a plurality of models for analysis.
Figure 5B:
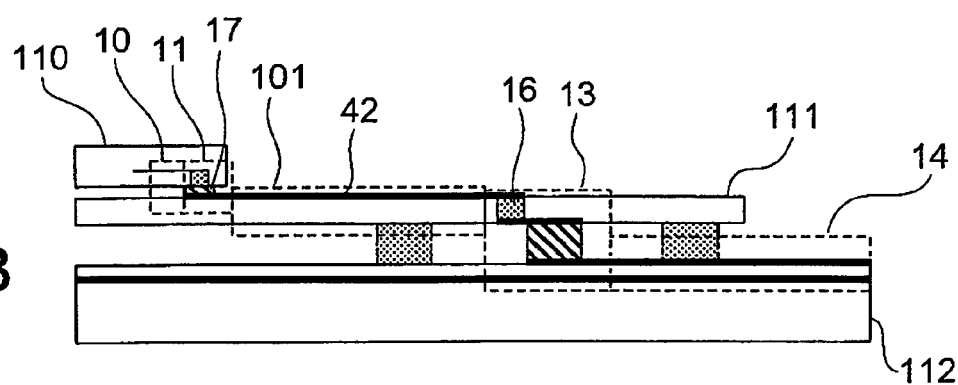

The FC-BGA shown in FIG. 4 is divided into a plurality of models for analysis in the following manner. FIGS. 5A and 5B are views showing examples in which the FC-BGA shown in FIG. 4 is divided into a plurality of models for analysis. Dashed lines in FIG. 5 represent cutting lines for division. In consideration of a series of transmission lines from the LSI chip 110 to the printed circuit board 112, the FC-BGA is divided into continuous sections having no steps in their patterns and connecting sections such as solder balls or vias. Each divided section is hereinafter referred to as a division model.

Each of the examples shown in FIGS. 5A and 5B has a division model 11 including a connecting section between the LSI chip 110 and the interposer 111, a division model 13 including a connecting section between the interposer 111 and the printed circuit board 112, a division model 10 including a continuous section of the LSI transmission line 41 in the LSI chip 110, and a division model 14 including a continuous section of the printed circuit board transmission line 46 in the printed circuit board 112.

The examples shown in FIGS. 5A and 5B have the following differences in the relationship between the division model 11 and the division model 13. In FIG. 5A, the division model 11 and the division model 13 are adjacent to each other, and a boundary between the division model 11 and the division model 13 is located near a central portion of the interposer transmission line 42 of the interposer 111. In FIG. 5B, a division model 101 including a portion of a continuous section of the interposer transmission line 42 in the interposer 111 is provided between the division model 11 and the division model 13.

As described above, division models are differently extracted in FIGS. 5A and 5B. Boundaries between division models are determined as intermediates of transverse electromagnetic (TEM) mode in which field intensity is uniform. Accordingly, boundaries between division models have some ranges. Such a range is illustrated in FIGS. 5A and 5B with respect to the boundary between the division model 11 and the division model 13. Description of reference data for determining a boundary between division models is referred to as a reference data file.

FIG. 6 is a table showing an example of a reference data file for division models. Each column of the table shown in FIG. 6 represents a boundary between adjacent division models. In the table of FIG. 6, two methods including a method using a maximum value and a method using a minimum value are shown as methods of extracting adjacent two division models. A chip direction in FIG. 6 corresponds to the left direction of FIGS. 5A and 5B. A board direction in FIG. 6 corresponds to the right direction of FIGS. 5A and 5B, which is a direction away from the LSI chip 110. Each example of FIGS. 5A and 5B will be described below with reference to the table shown in FIG. 6.

In the FC-BGA shown in FIG. 5A, a boundary between the division model 11 and the division model 101 (division model 11/division model 101) is set to be maximized in the right direction. Specifically, as shown in the table of FIG. 6, a right end of the division model 11 in FIG. 5A is located near a central position of the interposer transmission line 42 in the interposer 111. Further, a boundary between the division model 101 and the division model 13 (division model 101/division model 13) is set to be maximized in the left direction. Specifically, as shown in the table of FIG. 6, a left end of the division model 13 in FIG. 5A is located near the central position of the interposer transmission line 42 in the interposer 111. As a result, in the example shown in FIG. 5A, the division model 101 is not provided, and the division model 11 and the division model 13 are adjacent to each other.

In the FC-BGA shown in FIG. 5B, a boundary between the division model 11 and the division model 101 (division model 11/division model 101) is set to be minimized in the right direction. Specifically, as shown in the table of FIG. 6, a right end of the division model 11 in FIG. 5B is located at a position away from a boundary wall between the FC bump 17 and the interposer transmission line 42 by a half length of a thickness of a dielectric layer in the interposer transmission line 42. A dielectric layer in the interposer transmission line 42 is a structure of an insulating material interposed between a ground layer such as a ground line and a transmission line. Further, a boundary between the division model 101 and the division model 13 (division model 101/division model 13) is set to be minimized in the left direction. Specifically, as shown in the table of FIG. 6, a left end of the division model 13 in FIG. 5B is located at a position corresponding to a half length of a thickness of the dielectric layer in the interposer transmission line 42. As a result, in the example shown in FIG. 5B, the division model 101 is provided between the division model 11 and the division model 13. The term "dielectric" is used for various dielectrics such as a dielectric layer in the interposer transmission line 42.

In the table shown in FIG. 6, minimum values are based on reference values in a TEM mode. The reference values are determined by the thickness of dielectrics, steps in connecting sections, and the like. For example, the reference values for the division model 11 are determined by a difference between a diameter of the FC bump 17 and a line width of the interposer transmission line 42.

In the structures shown in FIGS. 5A and 5B, a boundary of the division model 13 near the printed circuit board 112 is determined in the following manner by a thickness of a dielectric forming a transmission line in the printed circuit board 112 and by a difference between a diameter of the solder ball 18 and a line width of the printed circuit board transmission line 46.

Assuming that the solder ball 18 has a diameter of about 1 mm, the dielectric has a thickness of about 0.3 mm. In a case where the printed circuit board transmission line 46 has a line width of about 0.6 mm, the aforementioned reference value can be defined as a half of the thickness of the dielectric because of small steps. On the other hand, in a case where the dielectric is as thin as 0.1 mm, a line width of the printed circuit board transmission line 46 becomes about 0.2 mm. Thus, a large difference is produced between the diameter of the solder ball 18 and the line width of the printed circuit board transmission line 46. In such a case, the boundary enters the interior of the printed circuit board transmission line 46, which will be described below with reference to results of measurement of an impedance in the division model 13.

Figure 7:
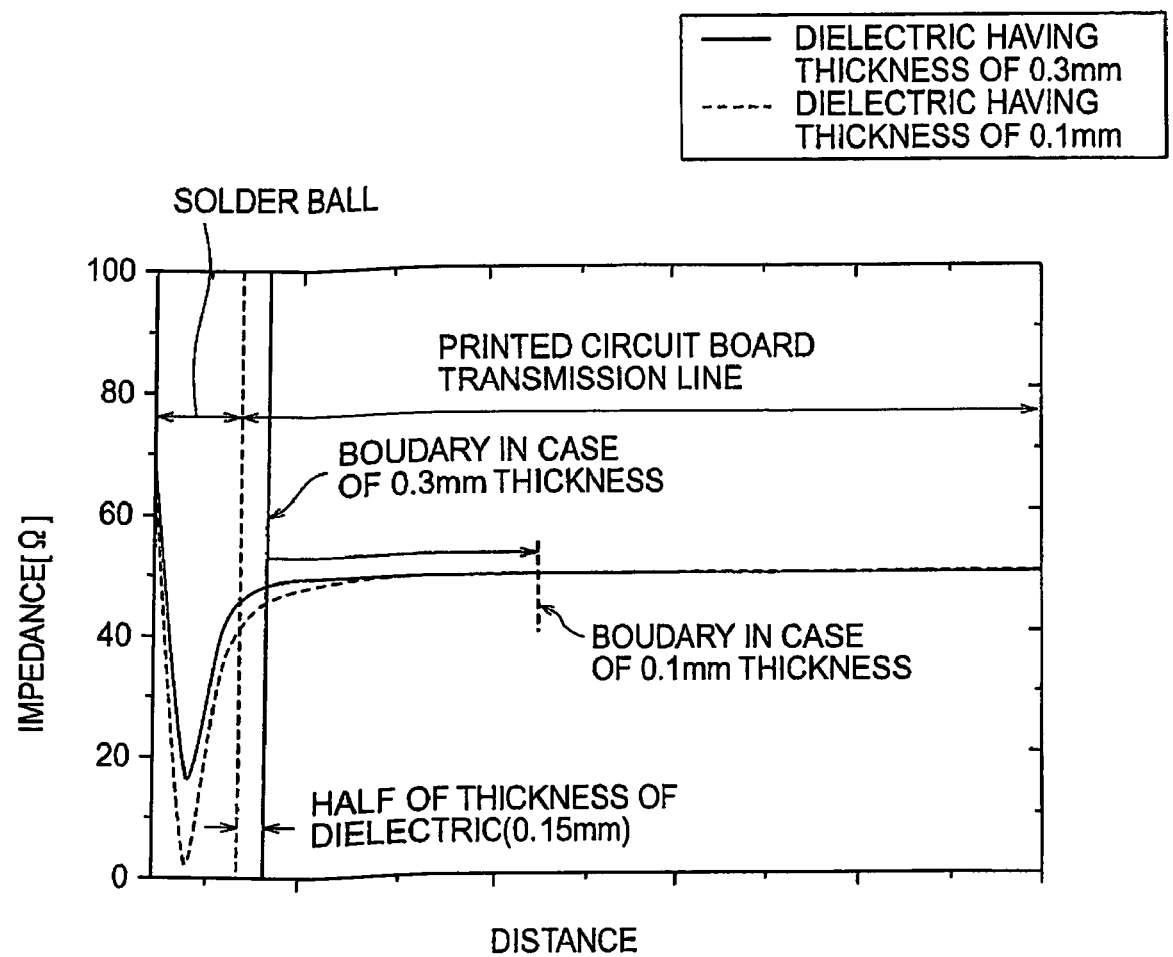
FIG. 7 is a graph showing an impedance of a transmission line from an interposer to a printed circuit board.

FIG. 7 is a graph showing an impedance of a transmission line from the interposer to the printed circuit board. The horizontal axis represents a distance from the interposer 111 in the transmission lines including the solder ball 18, and the vertical axis represents an impedance of the transmission line.

As shown in FIG. 7, the impedance is not less than 60Ω at a base portion of the solder ball 18 near the interposer 111. The impedance becomes smaller at locations away from the interposer 111 toward the printed circuit board 112 in the board direction. Thus, the impedance has a minimum value of not more than 20Ω near the center of the solder ball 18. The impedance becomes larger at locations further away from the interposer 111. Then, the impedance is saturated at about 50Ω in the transmission line of the printed circuit board 112.

As can be seen from FIG. 7, a distance from the solder ball 18 to a location at which the impedance is saturated in the transmission line of the printed circuit board 112 is equal to a half of the thickness of the dielectric. Thus, an optimal distance from an end of a connecting section in a division model is a half of the thickness of the dielectric.

In the above manner, a model is extracted at a location at which an impedance curve has a predetermined constant value in a transmission line. The extraction location varies in a direction indicated by arrow in FIG. 7 according to the thickness of the dielectric. Even in such a case, the extraction location is within the ranges shown in FIG. 6.

Thus, a division model is extracted in a predetermined range. Accordingly, even in a case of an actual FC-BGA pattern having various wiring, a designer can select extraction locations at which models can readily be extracted.

Figure 1:
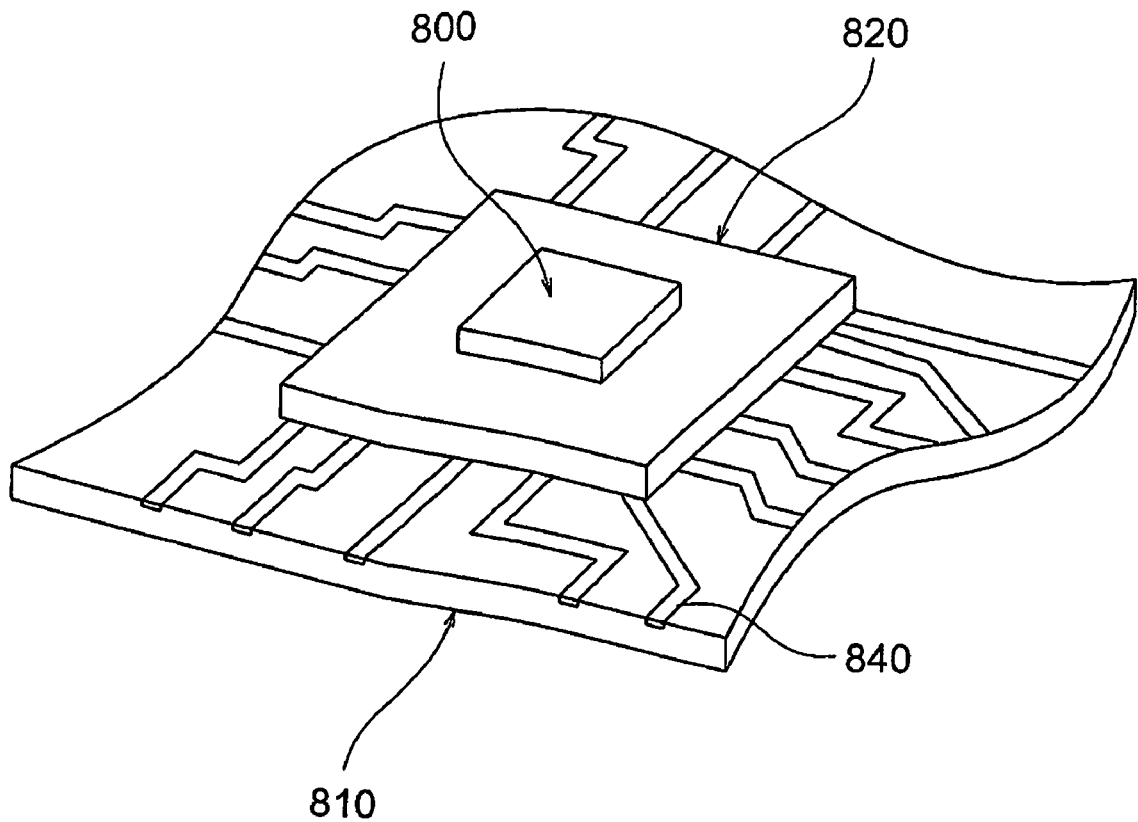
FIG. 1 is an exterior perspective view showing an example of an FC-BGA.
Figure 2:
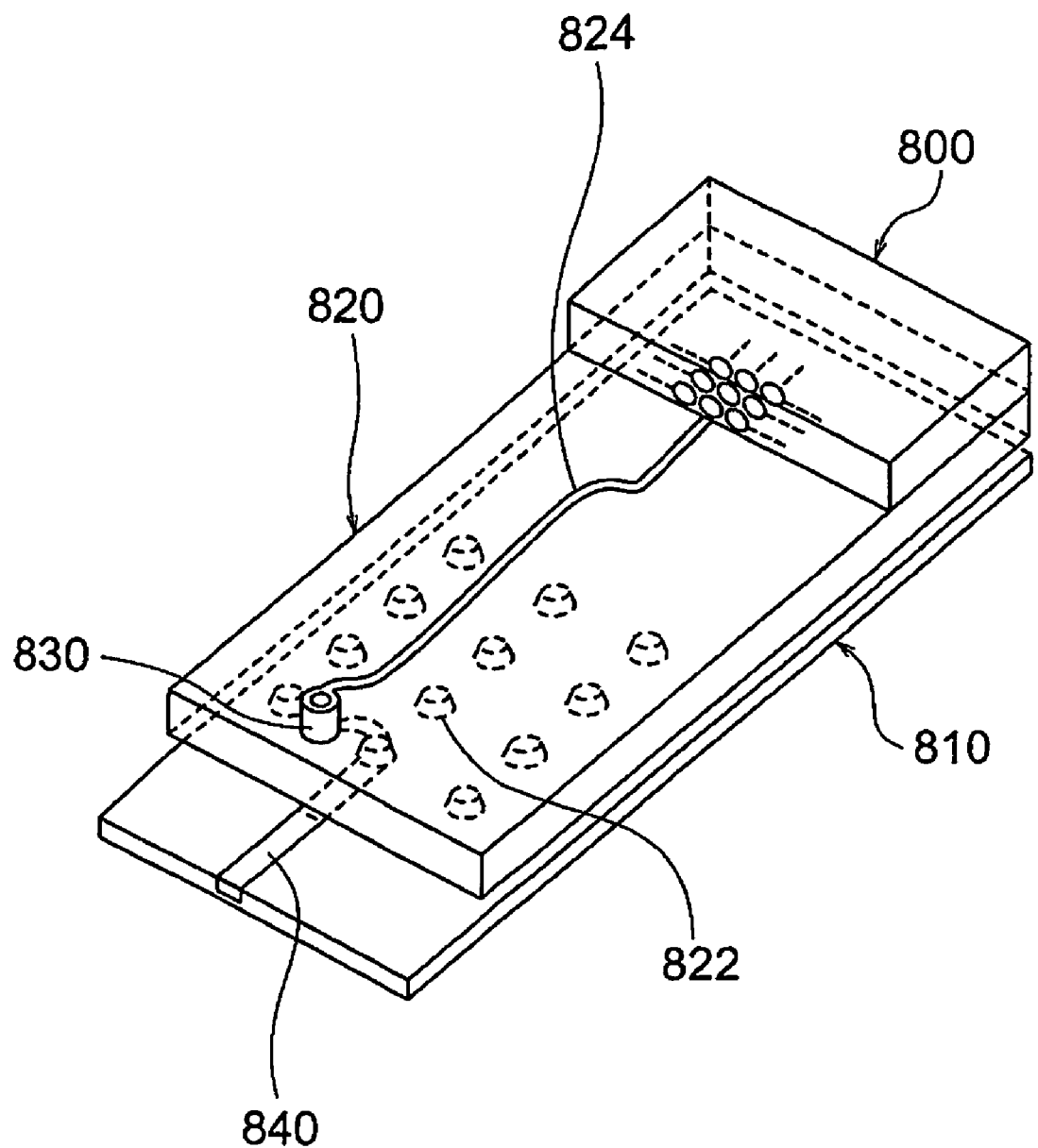
FIG. 2 is a perspective view showing a main portion of the FC-BGA shown in FIG. 1.
Figures 3A, 3B:
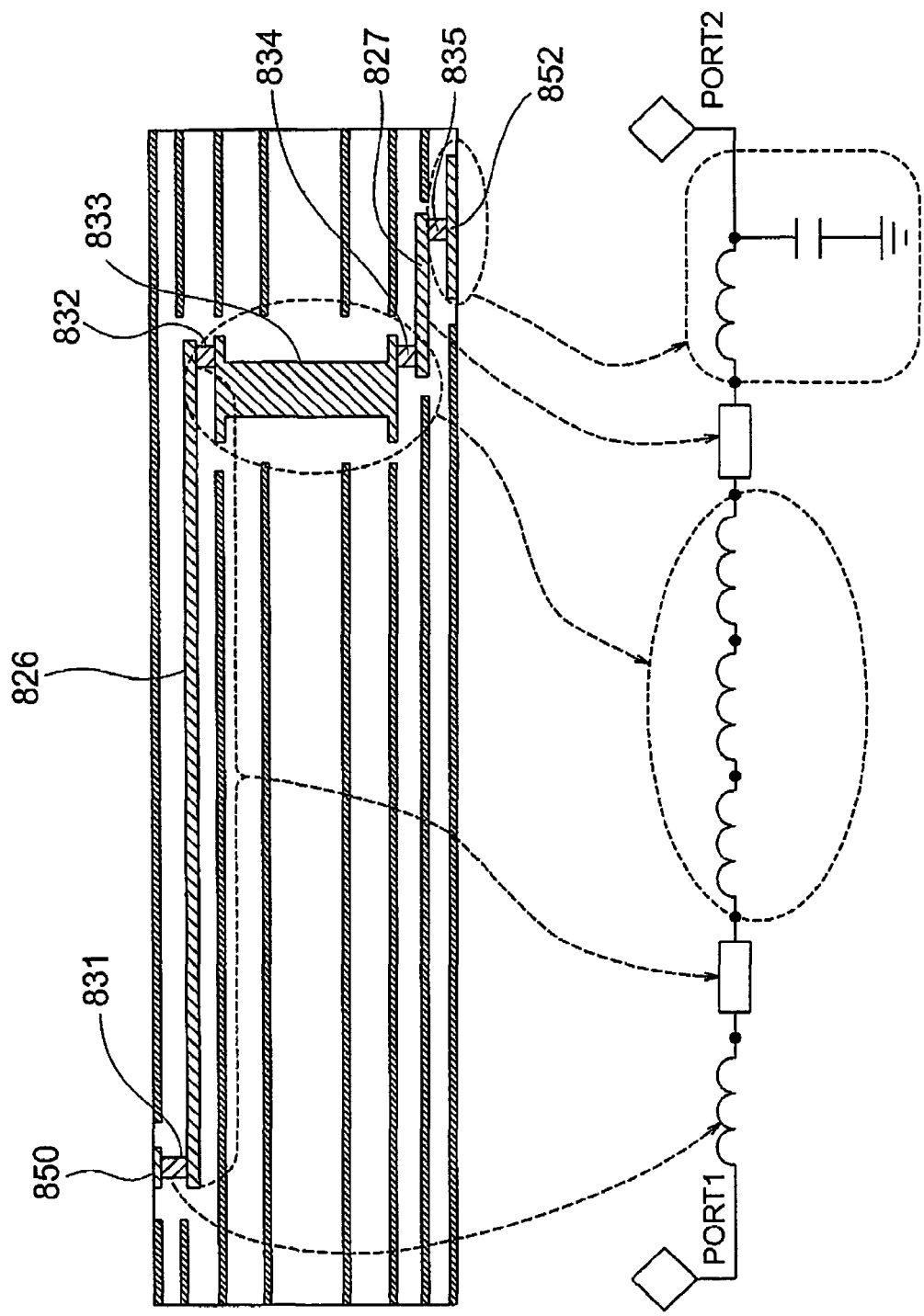
FIGS. 3A and 3B are views explanatory of a case where a conventional method of determining an equivalent circuit is applied to an interposer of the FC-BGA shown in FIG. 1.

The example shown in FIG. 5A, in which the boundaries have maximum values so that the division model 11 and the division model 13 are adjacent to each other, clearly differentiates from the conventional example. In the example shown in FIG. 5B, the boundaries approach toward the boundaries in the conventional example shown in FIG. 3. The example shown in FIG. 5A differs from the conventional example in defining extraction locations with the reference values shown in FIG. 6. Models divided under these extraction conditions can represent high-frequency characteristics with higher accuracy between models when these independent models are combined with each other. Thus, the synthesized model can maintain high-frequency characteristics.

Another arrangement of the FC-BGA will be described below. In the FC-BGA shown in FIGS. 5A and 5B, the transmission lines include two conductive layers of the interposer transmission line and the relay line. In contrast to the FC-BGA shown in FIGS. 5A and 5B, the following FC-BGA includes three conductive layers.

Figure 8:
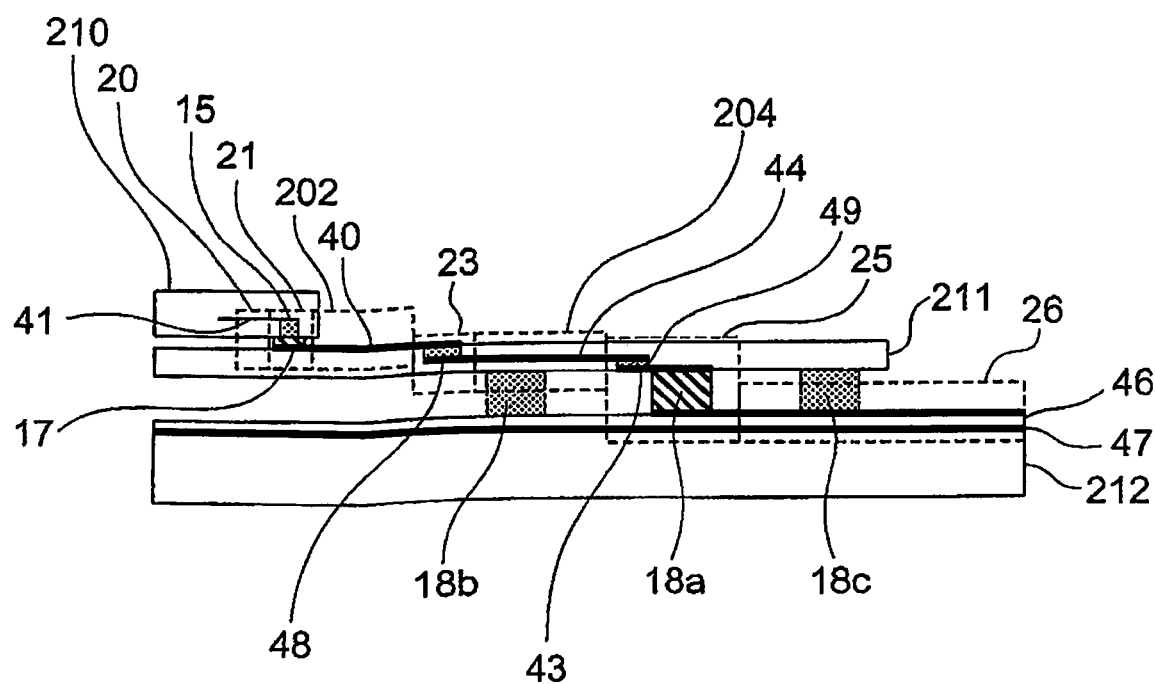
FIG. 8 is a schematic cross-sectional view showing an arrangement of the FC-BGA.

FIG. 8 is a cross-sectional view showing an example of the FC-BGA. Similar components to the components in FIGS. 4 and 5 are denoted by the same reference numerals.

As shown in FIG. 8, the FC-BGA has an LSI chip 210, an interposer 211, and a printed circuit board 212. The interposer 211 includes a first interposer transmission line 40 and a second interposer transmission line 44. The second interposer transmission line 44 is connected to the first interposer transmission line 40 by a via 48 and to a relay line 43 by a via 49. When a series of transmission lines from the LSI chip 210 to the printed circuit board 212 is divided in the same manner as described with reference to FIG. 5B, a region between the division model 21 and the division model 25 is divided into a division model 23, a division model 202, and a division model 204 as shown in FIG. 8. In the FC-BGA shown in FIG. 8, each of the division model 202 and the division model 204 includes a transmission line having a variable length. Accordingly, the flexibility of the arrangement of the division model 25 is improved.

In the present example, a minimum order model for the division models thus generated is used in the following manner to form a circuit model.

Figure 9:
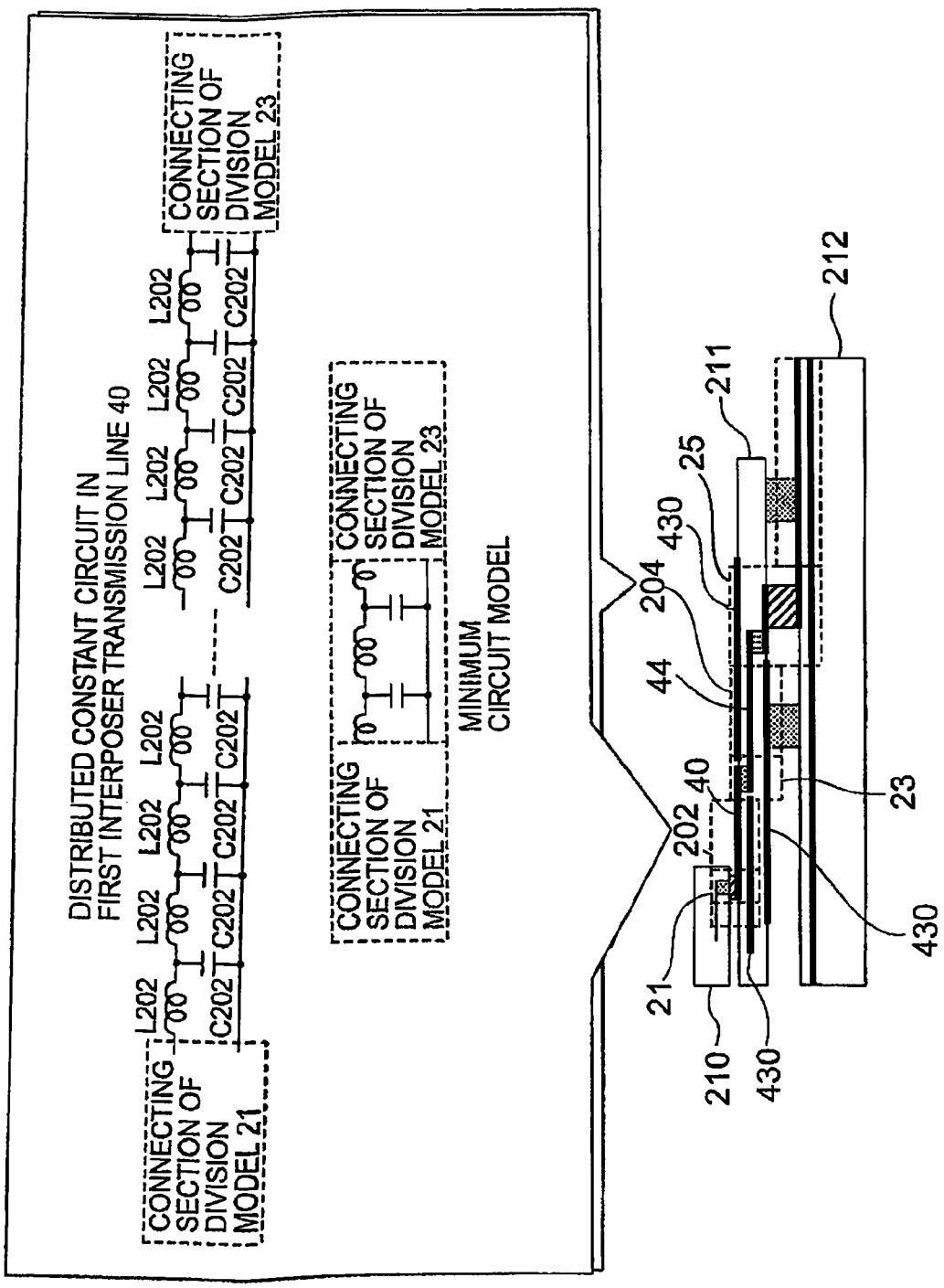
FIG. 9 is a schematic diagram explanatory of a circuit model of a division model including a continuous section.

FIG. 9 is a schematic diagram explanatory of a circuit model of a division model including a continuous section. FIG. 9 shows a circuit model of the first interposer transmission line 40 (and the second interposer transmission line 44) in the FC-BGA shown in FIG. 8. A uniform cross-sectional shape is continuously maintained in each of the first interposer transmission line 40 and the second interposer transmission line 44. These lines can be represented as distributed constant circuits. Since circuit models of these lines are similar to each other, only a circuit model of the first interposer transmission line 40 will be described below.

Assuming that the first interposer transmission line 40 includes inductances L202 and capacitances C202 distributed therein, a minimum circuit model for the first interposer transmission line 40 includes three inductances, which includes the inductance L202 and two additional inductances each having a half value of the inductance L202, and two capacitances. The additional inductances are connected to both sides of the inductance L202. According to the extraction method of the present invention, an extraction location is located within the transmission line. Therefore, an inductance having a half value of the inductance L202 is disposed in the transmission line near the division model 21 or the division model 23, and another inductance having a half value of the inductance L202 is disposed in the transmission line near the division model 202. An equivalent circuit of a division model including a continuous section is referred to as a continuous section equivalent circuit according to the present invention.

Figure 10:
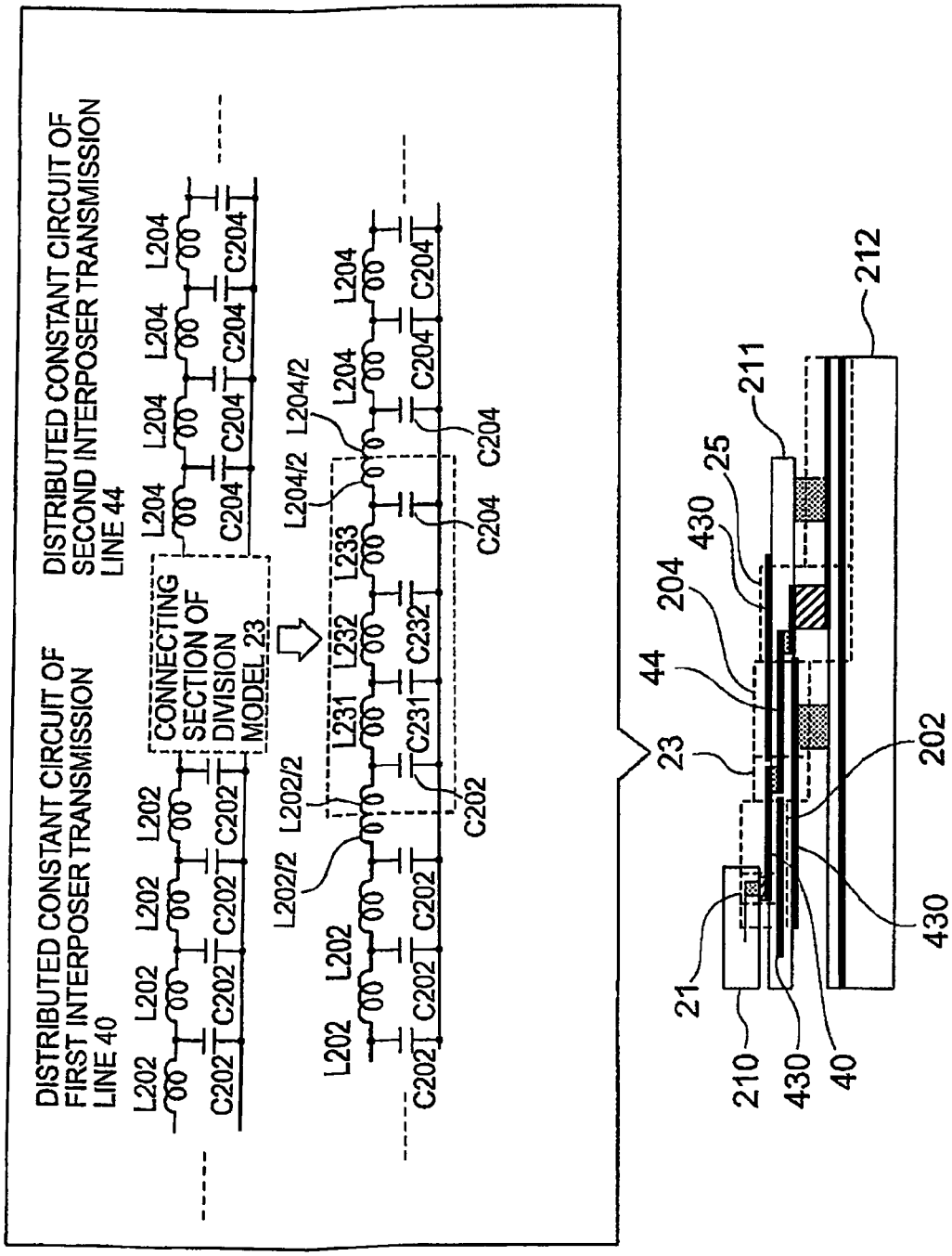
FIG. 10 is a schematic diagram explanatory of a circuit model of a division model including a connecting section.

Next, a circuit model for the division model 23 will be described below. FIG. 10 is a schematic diagram explanatory of a circuit model of a division model including a connecting section. As shown in FIG. 10, the first interposer transmission line 40 is a microstrip line in which a ground layer 430 is provided below the first interposer transmission line 40. The second interposer transmission line 44 is a strip line in which ground layers 430 are provided above and below the second interposer transmission line 44.

FIG. 10 shows distributed constant circuits of the first interposer transmission line 40 and the second interposer transmission line 44. The first interposer transmission line 40 includes inductances L202 and capacitances C202. The second interposer transmission line 44 includes inductances L204 and capacitances C204. The division model 23 is extracted at locations at which a TEM mode is established in relation to the first interposer transmission line 40 and the second interposer transmission line 44. Accordingly, a half of the inductance L202 of a distributed constant and a capacitance C202 are attached to a side of the interposer transmission line 202, and a half of the inductance L204 and a capacitance C204 are attached to a side of the interposer transmission line 204. Three inductances and two capacitances are provided as a minimum circuit at an intermediate portion.

When the division model 23 in the interposer is generated as a minimum circuit model according to a method of generating division models in this example, the generated model has five inductances and three capacitances as shown in FIG. 10.

Figure 11:
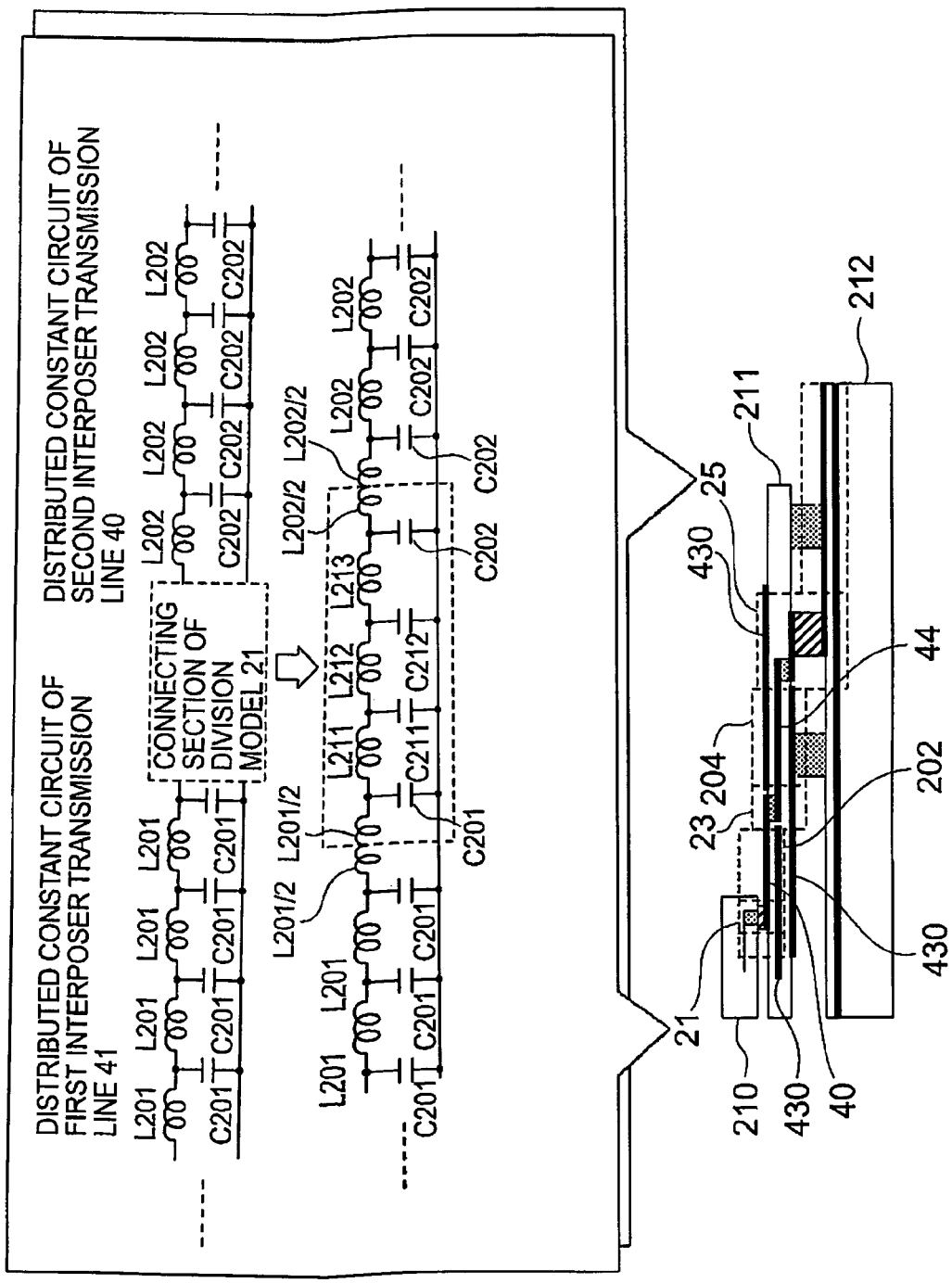
FIG. 11 is a schematic diagram explanatory of another circuit model of a division model including a continuous section.

FIG. 11 shows a circuit model of the division model 21 (and the division model 25). Circuit models of the division model 21 and the division model 25 are similar to the circuit model of the division model 23 described with reference to FIG. 10, and details thereof are omitted. An equivalent circuit of a division model including a connecting section is referred to as a connecting section equivalent circuit according to the present invention.

The analysis method in this example has features in how to extract a division model. By this extraction method, a circuit model is generated as shown in FIG. 9. When an S parameter model using S parameters is generated instead of a circuit model, the generated division model can also have a smaller scale and more accurately represent high-frequency characteristics as compared to a division model generated by a conventional method.

The conventional method requires a model of the entire transmission lines in order to represent high-frequency characteristics with accuracy. The scale of such a model becomes so large that the model cannot be used for a multipin design. By an analysis method according to the present invention, high-frequency characteristics of a GHz band can be represented accurately in a case where a plurality of division models are connected to each other. Thus, independent division models can be combined with each other to achieve a multipin design. Further, high-frequency characteristics can be guaranteed in the multipin design.

Next, a design apparatus for performing the above analysis method will be described. The following description relates to the case where the FC-BGA shown in FIG. 8 is to be analyzed.

Figure 12:
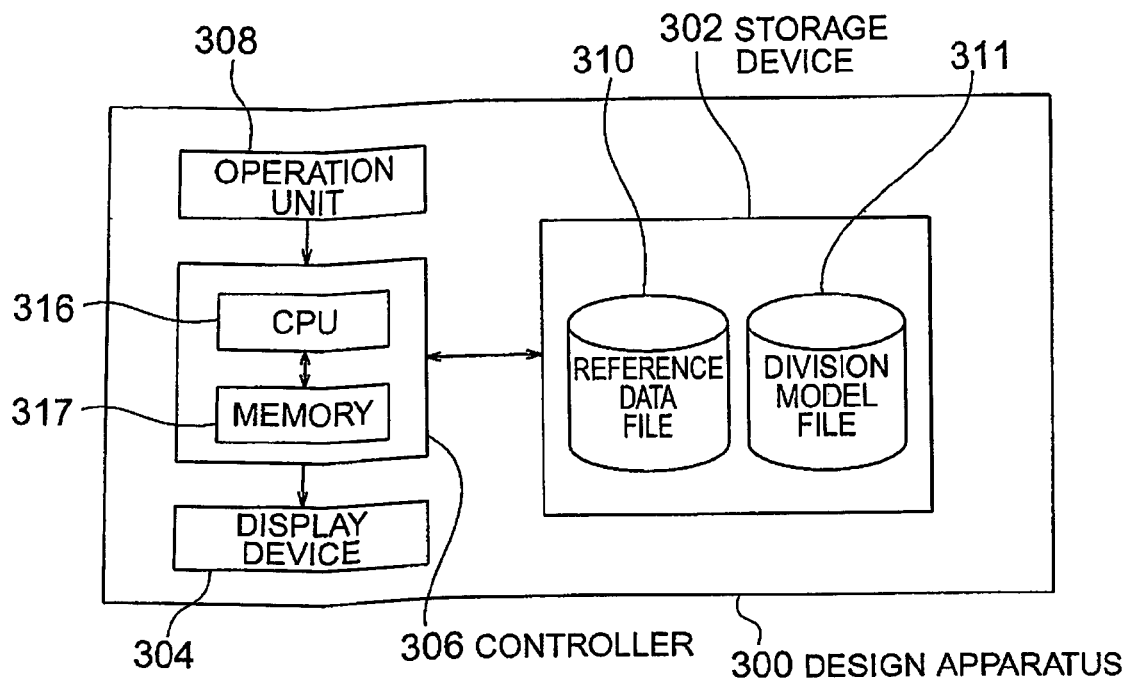
FIG. 12 is a schematic diagram showing an example of a design apparatus according to an embodiment of the present invention.

FIG. 12 is a schematic diagram showing an example of a design apparatus 300 for performing the above analysis method. The design apparatus 300 is formed by an information processing device such as a computer or a workstation. As shown in FIG. 12, the design apparatus 300 includes a storage device 302 for storing information on division models for analysis, a display device 304 for displaying division models, a controller 306 for controlling respective components in the apparatus, and an operation unit 308 for inputting instructions from a designer.

The storage device 302 includes a reference data file 310 storing information for selecting an extraction location of a division model and a division model file 311 storing circuit models for the corresponding division models. When the structure of the FC-BGA shown in FIG. 8 is to be analyzed, the reference data file 310 contains the information shown in FIG. 6. The division model file 311 includes information on circuit models of division models including a connecting section and division models including a continuous section. When the structure of the FC-BGA shown in FIG. 8 is to be analyzed, the division models including a connecting section correspond to the division model 21 including a connecting section between the LSI chip 210 and the interposer 211, the division model 23 including an interlayer connecting section in the interposer 211, and the division model 25 including a connecting section between the interposer 211 and the printed circuit board 212. The division model file 311 contains the information shown in FIGS. 10 and 11 for such division models. Further, the division models including a continuous section correspond to the first interposer transmission line 40, the second interposer transmission line 44, and the like. The division model file 311 contains the information shown in FIG. 9 for such division models. Additionally, the division model file 311 contains information on variations of division models and circuit models including a circuit constant for the corresponding variation.

In this example, analysis models stored in the division model file 311 are used as circuit models, However, S parameter models including information on S parameters may be used as circuit models. Alternatively, both of analysis models and S parameter models may be used as circuit models.

The controller 306 includes a memory 317 for storing programs and a central processing unit (CPU) 316 operable to perform predetermined processes according to the programs. When the controller 306 receives connection information, which is information on locations of connecting sections in a series of transmission lines from the LSI chip through the interposer to the printed circuit board, the controller 306 stores the connection information in the storage device 302. Subsequently, a connecting section is extracted with reference to the connection information and the reference data file 310 stored in the storage device 302. Further, when a boundary location is inputted based on the reference data file 310, a boundary of the connecting section is determined so as to divide the series of transmission lines into a connecting section and a continuous section. Then, all division models applied to the series of transmission lines are selected with reference to the division model file 311 stored in the storage device 302 to generate division models including information on circuit models. The generated division models are connected to each other so as to correspond to the series of transmission lines, and synthesis analysis is performed. For example, the synthesis analysis includes transmission characteristic analysis and signal waveform analysis.

Next, analysis operation in the design apparatus 300 will be described below. In the following description, the structure of the FC-BGA shown in FIG. 8 is to be analyzed.

Figure 13:
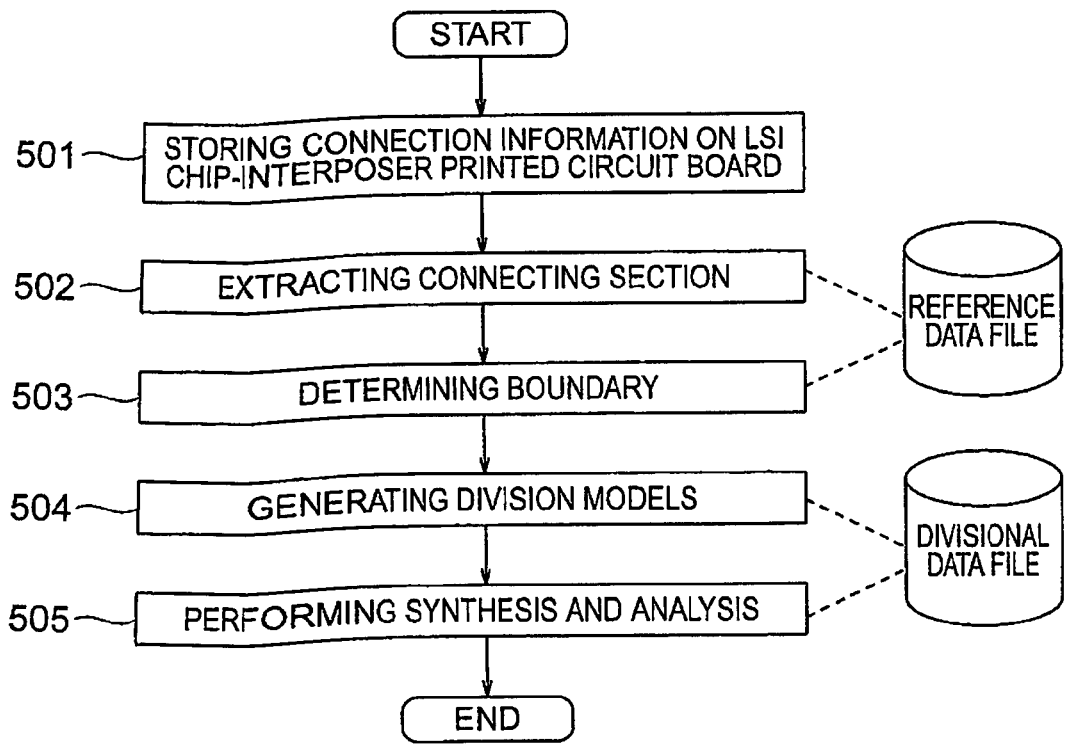
FIG. 13 is a flow chart showing steps of an analysis method according to an embodiment of the present invention.

FIG. 13 is a flow chart showing analysis operation in this example. As shown in FIG. 13, when a designer inputs connection information, which is information on locations of connecting sections in the series of transmission lines from the LSI chip 21 through the interposer 211 to the printed circuit board 212, the connection information is stored in the storage device 302 (Step 501). Then, a connecting section is extracted with reference to the connection information and the reference data file 310 stored in the storage device 302 (Step 502). When the designer subsequently inputs a boundary location based on the reference data file 310, a boundary of the connecting section is determined so as to divide the series of transmission lines into a connecting section and a continuous section (Step 503). Then, all division models applied to the series of transmission lines are selected with reference to the division model file 311 stored in the storage device 302 to generate division models including information on circuit models (Step 504). The generated division models are connected to each other so as to correspond to the series of transmission lines, and synthesis analysis is performed (Step 505).

Details of analysis operation In the present example will be described below. In the following description, the structure of the FC-BGA shown in FIG. 8 is to be analyzed as in the case of FIG. 13.

Figure 14:
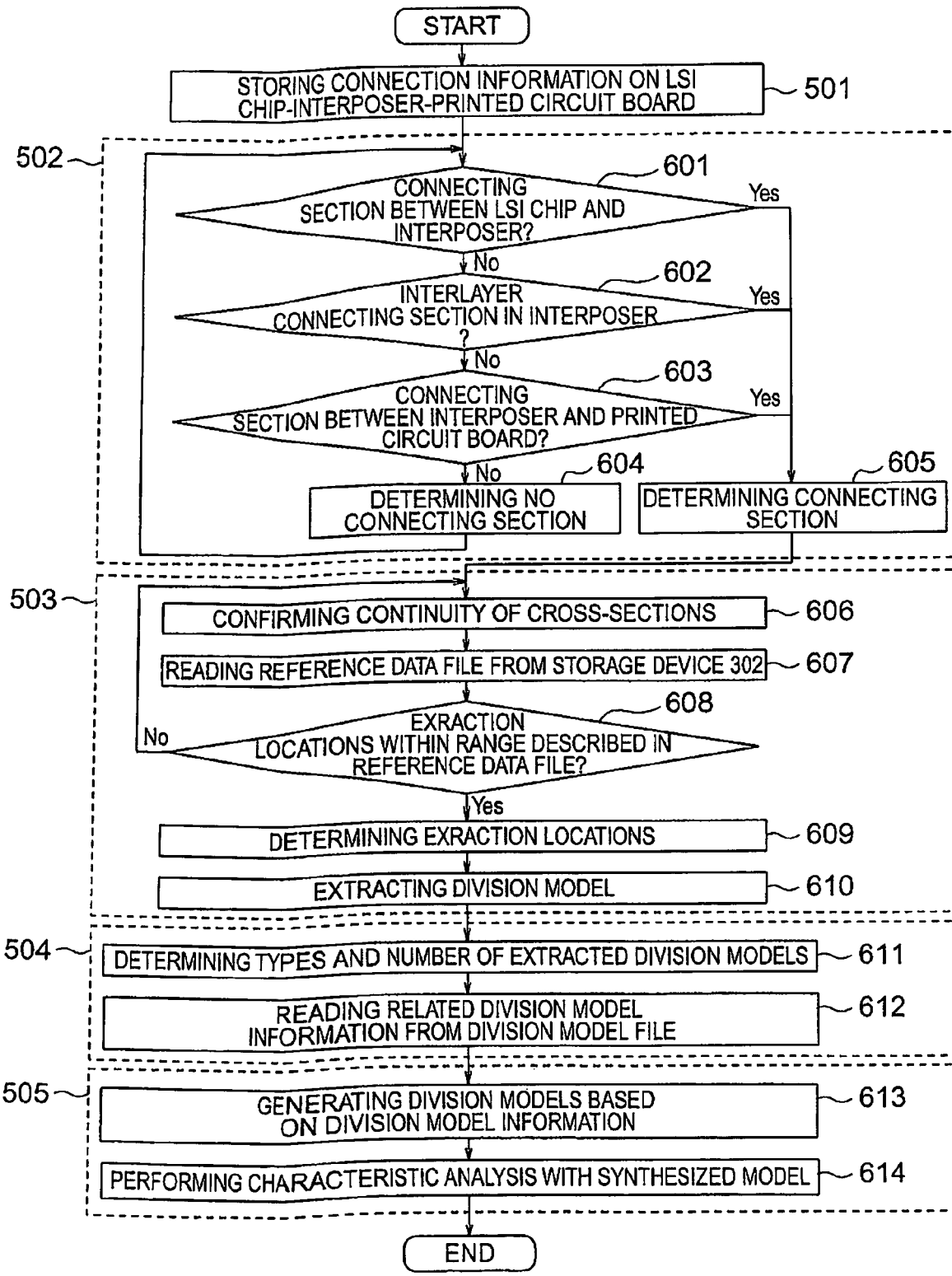
FIG. 14 is a flow chart showing details of the steps of the analysis method according to the embodiment of the present invention.

FIG. 14 is a flow chart showing analysis operation in this example. When a designer operates the operation unit 308 to input connection information, the controller 306 stores the connection information in the storage device 302 (Step 501). Then, transmission lines from the LSI chip 210 to the printed circuit board are divided into some portions, and a connecting section is extracted from these portions (Step 502). As shown in FIG. 14, in Step 502, the controller 306 determines whether the portion is a connecting section between the LSI chip and the interposer (Step 601), whether the portion is an interlayer connecting section in the interposer (Step 602), and whether the portion is a connecting section between the interposer and the printed circuit board (Step 603). If the portion does not fall into any of Steps 601 to 603, the same determination is performed on the next portion. If the portion falls into one of Steps 601 to 603, the following Step 503 is performed while the read portion is considered to be a connecting section.

After completion of extraction of connecting sections from the respective portions of a series of transmission lines in Step 502, boundaries are selected (Step 503). In Step 503, the controller 306 first confirms the continuity of cross-sections in the respective portions of the series of transmission lines from the LSI chip 210 to the printed circuit board 212 (Step 606). Subsequently, the controller 306 reads the reference data file 310 (Step 607) and displays the table shown in FIG. 6 on the display device 304. A designer inputs a boundary location within a range predetermined for each division model including a connecting section with reference to the table displayed on the display device 304. The controller 306 determines locations of both ends of the division model in a range between a minimum value and a maximum value shown in FIG. 6. Then, the controller 306 determines whether the extraction locations are within the range described in the reference data file 310 (Step 608). If the extraction locations are not within the range, the procedure returns to Step 606. If the extraction locations are within the range, the extraction locations are determined for the inputted boundary location (Step 609). Thus, a division model is extracted (Step 610).

Figure 15A:
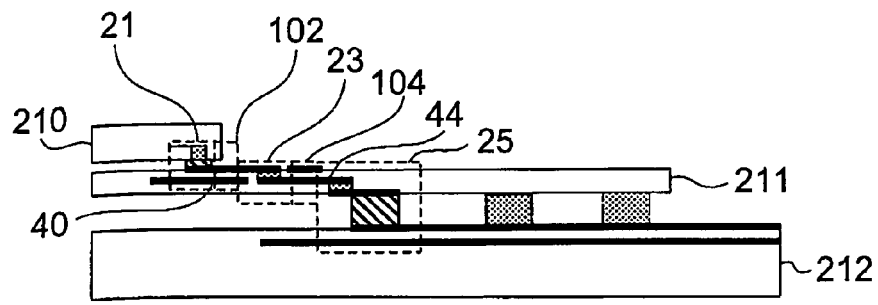
FIGS. 15A through 15C are cross-sectional views showing an example of extraction of division models from the FC-BGA shown in FIG. 8.
Figure 15B:
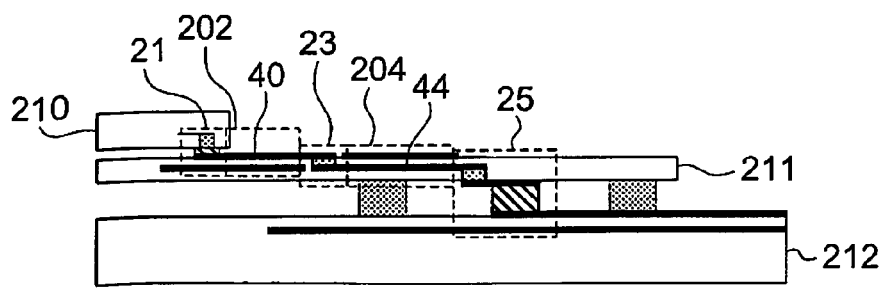
Figure 15C:
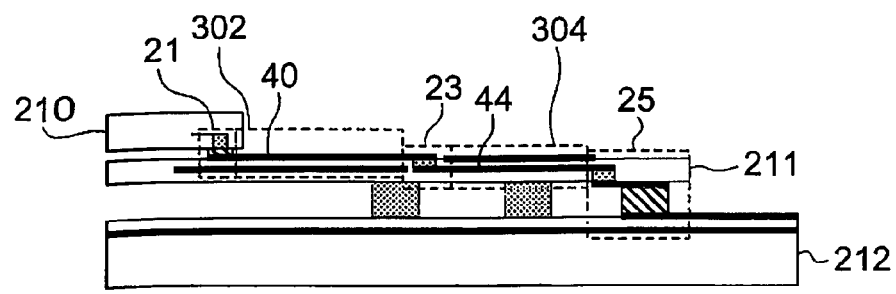

Examples of extraction of division models will be described in connection with the FC-BGA shown in FIG. 8. FIGS. 15A through 15C are cross-sectional views showing examples of extraction of division models from the FC-BGA shown in FIG. 8. The lengths of the first interposer transmission line 40 and the second interposer transmission line 44 shown in FIG. 15C are larger than those in FIG. 15B. Further, the lengths of the first interposer transmission line 40 and the second interposer transmission line 44 shown in FIG. 15B are larger than those in FIG. 15A.

Figure 16:
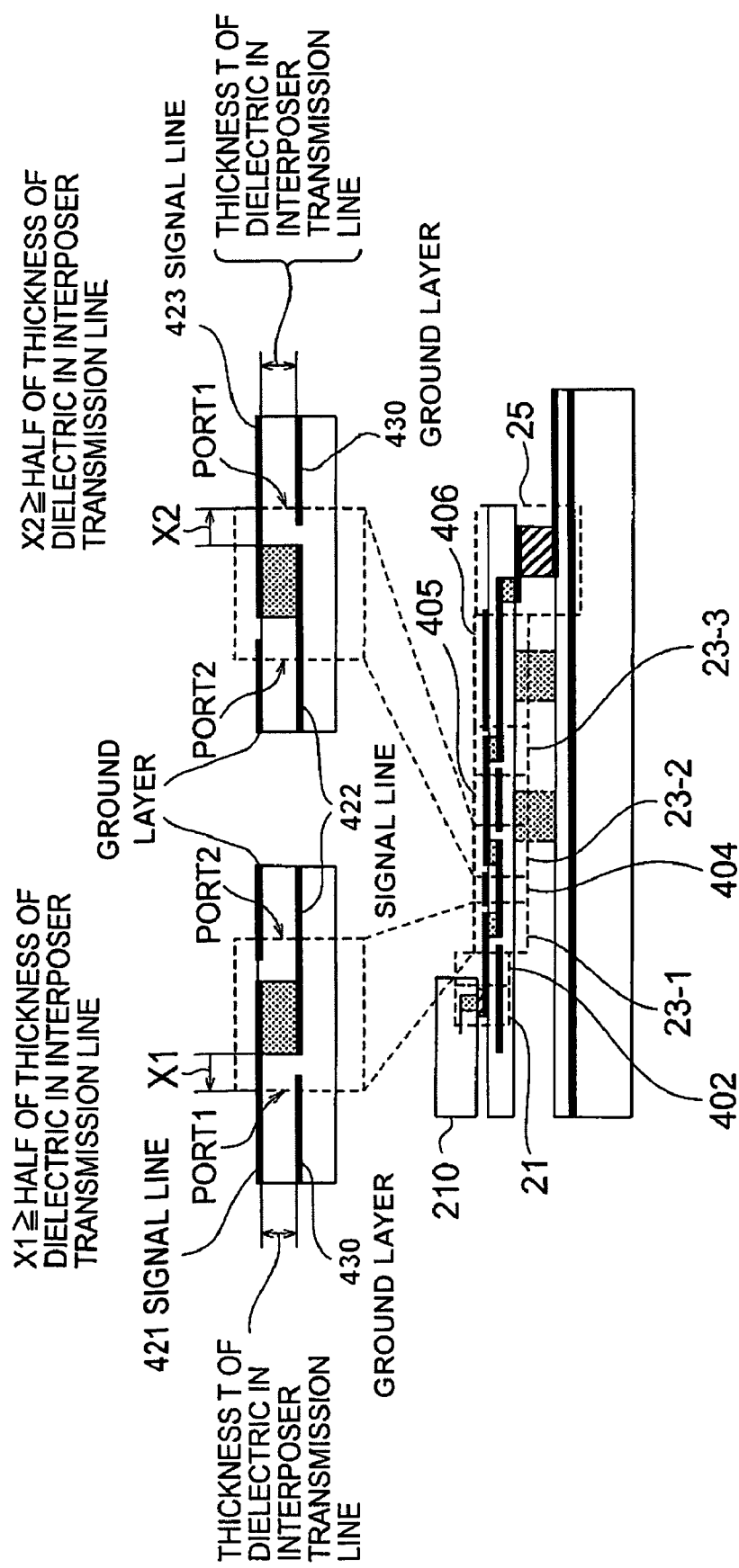
FIG. 16 is a cross-sectional view showing an example of generation of division models in a case where transmission lines intersect one another.

Next, an example of generation of division models will be described in a case where transmission lines intersect one another. FIG. 16 is a cross-sectional view showing an example of generation of division models in a case where transmission lines intersect one another. FIG. 16 shows an example of wiring used to intersect other wiring. As shown in FIG. 16, a transmission line comes down from a signal line 421 to a signal line 422 of an intermediate layer in a division model 23-1 and comes up to a signal line 423 in a division model 23-2. Further, the transmission line is connected through a division model 23-3 to a division model 25, which is connected to a BGA pad. Thus, in this example, known models are combined with each other to describe an unknown structure.

These models have different losses R and G in a characteristic impedance of a transmission line, which is represented by:

$$\sqrt{\frac{R+j\omega L}{G+j\omega C}}$$

When the model has a continuous cross-sectional shape as described above, the scale of the model is smaller than those of the division models 11, 13, and 15. Similarly, the scales of the division models 104, 204, 304, 404, and 406 are small and thus easy to generate.

FIG. 17 is a table showing connections of transmission lines as shown in FIGS. 15A, 15B, 15C, and 16. FIG. 17 shows four cases including wiring A, B, C, and D from the division model 21 to the division model 25. FIGS. 15A, 15B, and 15C, in which the lengths of the first interposer transmission line 40 and the second interposer transmission line 44 gradually increase, correspond to wiring A, B, and C, respectively. The lengths of the transmission lines in the respective division models are as follows.

Division model 102< division model 202< division model 302

Division model 104< division model 204< division model 304

FIG. 16 corresponds to wiring D in FIG. 17. In the table shown in FIG. 17, the division models 102, 202, 302, 402, and 405 represent interposer transmission lines having the same cross-sectional shape but different lengths.

As described above, the division model is generated in Step 610 of FIG. 14. Then, Steps 504 and 505 are conducted in the following manner. The controller 306 specifies all types of extracted division models with reference to the reference data file 310 in the storage device 302. Further, the controller 306 specifies the number of the division models included in the series of transmission lines (Step 611). With regard to the specified division models, division model information including circuit model information as shown in FIGS. 9 through 11 is read from the division model file 310 (Step 612).

Further, the controller 306 generates division models including circuit model information (Step 613) and connects the generated division models to each other so as to correspond to the series of transmission lines. Then, the controller 306 performs analysis of electric characteristics with the synthesized model (Step 614).

As a matter of course, the present invention is not limited to circuit models shown in FIGS. 9 through 11. Other circuit models will be described below.

Figure 18A:
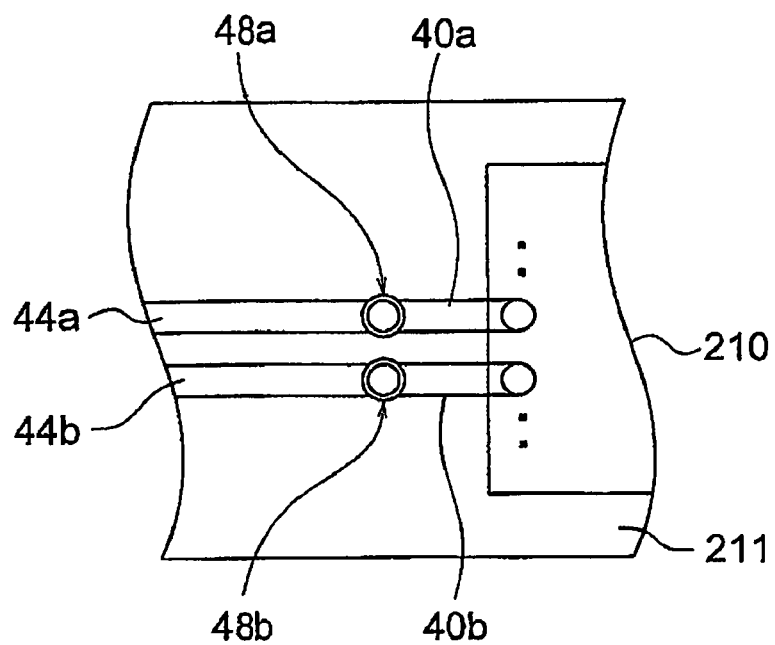
FIG. 18A is a plan view showing an interposer in which connecting sections are disposed in parallel.
Figure 18B:
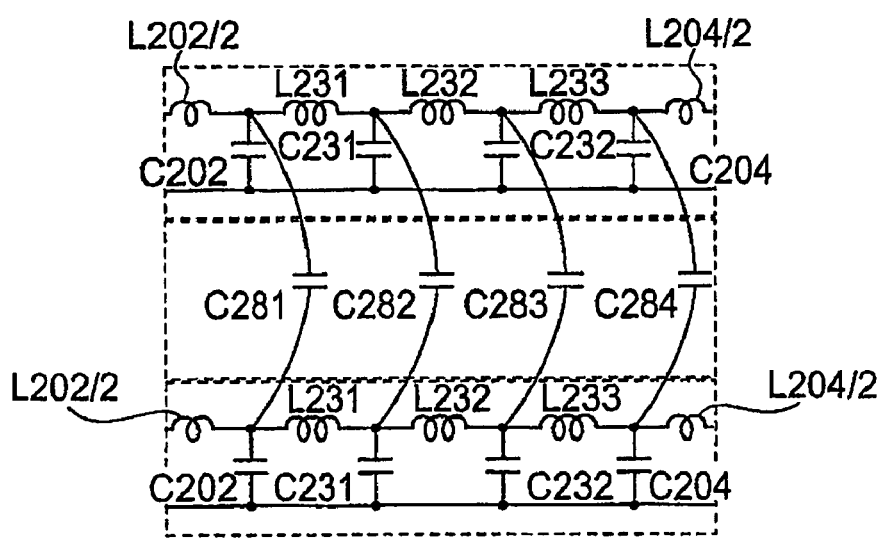
FIG. 18B is a schematic diagram showing an equivalent circuit model of the interposer shown in FIG. 18A.

FIG. 18A is a plan view showing an interposer having two connecting sections arranged in parallel. FIG. 18B is a schematic diagram showing an equivalent circuit model of the interposer shown in FIG. 18A. In some cases, separate transmission lines are provided in parallel as shown in FIG. 18A. When a first interposer transmission line 40a and a first interposer transmission line 40b shown in FIG. 18A are disposed at an interval within a predetermined range, a via 48a of the first interposer transmission line 40a and a via 48b of the first interposer transmission line 40b are close to each other. Accordingly, as shown in FIG. 18B, the circuit model is formed so as to have capacitances between a division model including the via 48a and a division model including the via 48b.

Figure 19A:
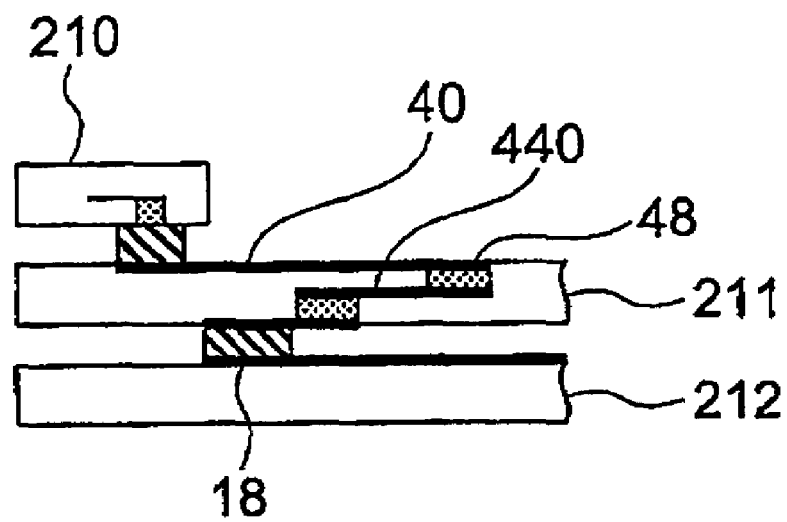
FIG. 19A is a cross-sectional view showing an FC-BGA in which transmission lines are stacked via dielectrics.
Figure 19B:
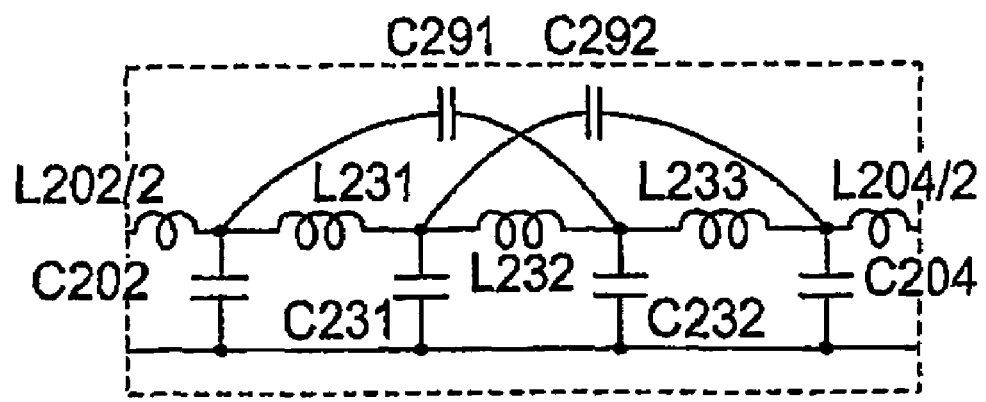
FIG. 19B is a schematic diagram showing an equivalent circuit model of the FC-BGA shown in FIG. 19A.

FIG. 19A is a cross-sectional view showing an FC-BGA in which transmission lines are stacked via dielectrics. FIG. 19B is a schematic diagram showing an equivalent circuit model of the FC-BGA shown in FIG. 19A. In some cases, separate transmission lines each having a continuous section are provided in an interposer at a predetermined interval in a direction perpendicular to a substrate surface of the interposer. FIG. 19A shows an example of such cases. In FIG. 19A, the first interposer transmission line 40 is connected to a second interposer transmission line 440 by the via 48. The second interposer transmission line 440 extends toward the LSI chip 210. Accordingly, as shown in FIG. 19B, the circuit model is formed so as to have capacitances between a division model including the first interposer transmission line 40 and a division model including the second interposer transmission line 440.

Thus, with use of a circuit model corresponding to an arrangement of transmission lines, it is possible to analyze a package more accurately.

According to an analysis method of the present invention, a connecting section is extracted from a series of transmission lines including an LSI chip, an interposer, and a printed circuit board. The connecting section is modeled including transmission lines connected to the connecting section. The reference data file defines extraction locations in continuous transmission lines. Specifically, even if the connecting section is extracted at any extraction location, adjacent transmission lines have the same cross-sectional shape. When the generated division models are to be connected to each other, surfaces having the same cross-sectional shape are connected to each other. Alternatively, a transmission line model having the same cross-sectional shape but a different length and extending in a signal transmission direction may be inserted between the division models. In these cases, the model can maintain the continuity and discontinuity in an actual structure. Thus, by dividing a series of transmission lines into a division model including a continuous section and a division model including a connecting section, analysis can be performed with information on analysis models corresponding to the division models. Accordingly, it is possible to analyze an actual package structure more accurately.

Further, since the generated division models can be connected continuously to a transmission line having the same cross-sectional shape but a different length, no disturbance is caused to an electromagnetic field. Accordingly, it is possible to represent an actual transmission mode (signal transmission in a TEM mode) and provide a model for accurate analysis of high-frequency characteristics.

As compared to a case where an electromagnetic field analysis model of the whole circuit is generated, a synthesized model of connected division models according to the present invention requires a smaller amount of computer resources. Specifically, an electromagnetic field analysis model is generated by dividing an object into fine meshes in a finite element method. The entire analysis exponentially increases the amount of required computer resources. According to the present invention, individual division models are made smaller by one order to two orders. Accordingly, analysis can be completed in a shorter period of time.

According to an analysis method of the present invention, small division models are connected so as to form a synthesized model to describe the whole circuit. Therefore, analysis can be completed in a shorter period of time as compared to a case where an electromagnetic field analysis model is generated to describe the whole circuit. Further, the high-frequency characteristic accuracy can be maintained at a connecting portion between the divided models. Furthermore, the frequency characteristic accuracy can be maintained in a packaging structure after the division models are connected to each other. Accordingly, it is possible to test operation of the entire transmission line from an LSI chip, an interposer, and a printed circuit board.

Further, with regard to methods of determining and dividing ranges for a model to be generated with high-frequency characteristic accuracy, the accuracy in analysis of high-frequency characteristics in a multipin LSI having many input and output signals can be maintained with a limited amount of CAE computer resources. Further, operation test can be completed in a shorter period of time. Accordingly, packaging performance of a high-speed multipin LSI can be guaranteed at the time of design. Further, it is possible to reduce a development period and cost required for LSI products and devices using these LSI products and to improve the productivity.

The interposer includes a ground layer as shown in FIGS. 9 through 11. However, the ground layer is not illustrated in FIGS. 4, 5, 8, and 15 for brevity.

Although certain preferred embodiments of the present invention have been shown and described in detail, it should be understood that various changes and modifications may be made therein without departing from the scope of the appended claims.

What is claimed is:

1. An analysis method of designing transmission lines of an integrated circuit packaging board including an integrated circuit chip, a printed circuit board, and an interposer disposed between the integrated circuit chip and the printed circuit board, said analysis method comprising the steps of:

preparing a reference data file having information for dividing a series of transmission lines, from the integrated circuit chip through the interposer to the printed circuit board, into sections wherein each section is classified into a connecting section or a continuous section, the connecting section electrically connecting different conductive layers to each other and the continuous section including a conductive layer having a uniform cross-section in a signal transmission direction;

preparing a division model file having information on analysis models wherein each model corresponds to a division model including at least one of the connecting section and the continuous section;

inputting connection information on positions of connecting section(s) in the series of transmission lines;
extracting connecting section(s) from the series of transmission lines with reference to the input connection information;
determining, with reference to the reference data file, boundary and/or boundaries for dividing the series of transmission lines into sections wherein each section is a connecting section or a continuous section;
generating, with reference to the division model file, division models wherein each division model corresponds to one of the sections divided with the boundary and/or boundaries;
synthesizing the division models to form a synthesized model of the series of transmission lines; and
analyzing electrical characteristics of the series of transmission lines based on the synthesized model.

2. The analysis method claimed in claim 1, wherein:
said extracting step determines, with reference to the connection information, whether a portion of the series of transmission lines is at least one of a connecting section between the integrated circuit chip and the interposer, a connecting section between layers in the interposer, and a connecting section between the interposer and the printed circuit board, in order to judge that the portion includes a connecting section;
said determining step confirms whether or not the portion of the series of transmission lines has a uniform cross-section in the signal transmission direction, and determines a cutting point of the series of transmission lines in the signal transmission direction with reference to the reference data file;
said generating step specifies, in the division model file; the information on the analysis model corresponding to the division model including the connecting section or the division model including the continuous section;
said synthesizing step connects the information on the analysis models so as to correspond to the series of transmission lines to form the synthesized model; and
said analyzing step performs transmission characteristic analysis or signal waveform analysis on the synthesized model.

3. The analysis method claimed in claim 2, wherein:
the reference data file includes information on a range of a distance from a boundary wall of the connecting section for the division model including the connecting section, the range having a minimum value of a half of a thickness of a dielectric in a transmission line and a maximum value at a center of the transmission line in the continuous section adjacent to the connecting section; and
said determining step determines the cutting point of the transmission lines in the signal transmission direction with reference to the range in the reference data file for each division model including the connecting section.

4. The analysis method claimed in claim 3, wherein said determining step employs the maximum value for the boundary of the division model including the connecting section.

5. The analysis method claimed in claim 1, wherein the information on the analysis models includes information on an S parameter model.

6. The analysis method claimed in claim 1, wherein the information on the analysis models includes information on a circuit model represented by a circuit constant.

7. The analysis method claimed in claim 1, wherein the information on the analysis models includes information on an S parameter model and information on a circuit model represented by a circuit constant.

8. The analysis method claimed in claim 1, wherein:
said generating step generates the division model including the connecting section in the interposer with a connecting section equivalent circuit having a first inductor connected to the connecting section in the signal transmission direction, a second inductor connected to the connecting section in a direction opposite to the signal transmission direction, a plurality of third inductors disposed between the first inductor and the second inductor, and a plurality of capacitors connected to connecting portions between the first inductor, the second inductor, and the plurality of third inductors; and
said synthesizing step replaces connection between the division model of the connecting section equivalent circuit and an adjacent division model with an equivalent circuit having an inductor connecting the division models to each other.

9. The analysis method claimed in claim 8, wherein the connecting section equivalent circuit has five inductors and three capacitors.

10. The analysis method claimed in claim 8, wherein each of the first inductor and the second inductor has an inductance of a half of that of a distributed constant circuit of a transmission line in the adjacent division model.

11. The analysis method claimed in claim 8, wherein said synthesizing step employs an equivalent circuit having a capacitor connected between a first division model including a first connecting section and a second division model including a second connecting section when the first division model and the second division model are provided in different transmission lines and spaced from each other within a predetermined range.

12. The analysis method claimed in claim 8, wherein said synthesizing step employs an equivalent circuit having a capacitor connected between a first division model including a first continuous section and a second division model including a second continuous section when the first division model and the second division model are provided in different transmission lines and spaced from each other within a predetermined range.

13. The analysis method claimed in claim 1, wherein:
said generating step generates the division model including the continuous section in the interposer with a continuous section equivalent circuit having a first inductor connected to the continuous section in the signal transmission direction, a second inductor connected to the continuous section in a direction opposite to the signal transmission direction, a third inductor disposed between the first inductor and the second inductor, and a plurality of capacitors connected to connecting portions between the first inductor, the second inductor, and the third inductor; and
said synthesizing step replaces connection between the division model of the continuous section equivalent circuit and an adjacent division model with an equivalent circuit having an inductor connecting the division models to each other.

14. The analysis method claimed in claim 13, wherein each of the first inductor and the second inductor has an inductance of a half of that of a distributed constant circuit of a transmission line in the adjacent division model.

15. The analysis method claimed in claim 13, wherein said synthesizing step employs an equivalent circuit having a capacitor connected between a first division model including a first connecting section and a second division model including a second connecting section when the first division model and the second division model are provided in different transmission lines and spaced from each other within a predetermined range.

16. The analysis method claimed in claim 13, wherein said synthesizing step employs an equivalent circuit having a capacitor connected between a first division model including a first continuous section and a second division model including a second continuous section when the first division model and the second division model are provided in different transmission lines and spaced from each other within a predetermined range.

17. An analysis apparatus for designing transmission lines of an integrated circuit packaging board including an integrated circuit chip, a printed circuit board, and an interposer disposed between the integrated circuit chip and the printed circuit board, said analysis apparatus comprising:

a storage device for storing a reference data file and a division model file, said reference data file having information for dividing a series of transmission lines, from the integrated circuit chip through the interposer to the printed circuit board, into a connecting section electrically connecting different conductive layers to each other and a continuous section including a conductive layer having a uniform cross-section in a signal transmission direction, said division model file having information on analysis models corresponding to a division model including the connecting section or a division model including the continuous section;

an operation unit for inputting connection information of the series of transmission lines; and a controller operable to extract the connecting section from the series of transmission lines, determine a boundary for dividing the series of transmission lines into the connecting section and the continuous section with reference to said reference data file, generate division models including the information on the analysis models with reference to the information on the analysis models corresponding to the division model including the connecting section or the division model including the continuous section in said division model file, synthesize the information on the analysis models to form a synthesized model, and analyze electrical characteristics with use of the synthesized model.

18. A computer-readable storage medium having a program recorded thereon for executing a procedure with a computer for designing transmission lines of an integrated circuit packaging board including an integrated circuit chip, a printed circuit board, and an interposer disposed between the integrated circuit chip and the printed circuit board, said procedure comprising:

storing a reference data file and a division model file, the reference data file having information for dividing a series of transmission lines, from the integrated circuit chip through the interposer to the printed circuit board, into a connecting section electrically connecting different conductive layers to each other and a continuous section including a conductive layer having a uniform cross-section in a signal transmission direction, the division model file having information on analysis models corresponding to a division model including the connecting section or a division model including the continuous section;

inputting connection information of the series of transmission lines;

extracting the connecting section from the series of transmission lines after said inputting the connection information;

determining a boundary for dividing the series of transmission lines into the connecting section and the continuous section with reference to the reference data file;

generating division models including the information on the analysis models with reference to the information on the analysis models corresponding to the division model including the connecting section or the division model including the continuous section in the division model file;

synthesizing the information on the analysis models to form a synthesized model; and analyzing electrical characteristics with use of the synthesized model.

* * * * *